United States Patent
Sakumoto

(10) Patent No.: US 8,478,322 B2
(45) Date of Patent: Jul. 2, 2013

(54) WIRELESS COMMUNICATION APPARATUS AND BAND ASSIGNING METHOD

(75) Inventor: Kazunori Sakumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 366 days.

(21) Appl. No.: 13/047,086

(22) Filed: Mar. 14, 2011

(65) Prior Publication Data
US 2011/0300888 A1 Dec. 8, 2011

(30) Foreign Application Priority Data
Jun. 3, 2010 (JP) .................................. 2010-127864

(51) Int. Cl.
*H04B 7/26* (2006.01)

(52) U.S. Cl.
USPC ........... 455/509; 455/450; 455/464; 370/280; 370/328; 370/335; 370/468

(58) Field of Classification Search
USPC ........................................................ 455/509
See application file for complete search history.

(56) References Cited

U.S. PATENT DOCUMENTS

| | | | | |
|---|---|---|---|---|
| 4,814,900 A * | 3/1989 | Nemoto et al. | ............... | 386/263 |
| 5,671,219 A * | 9/1997 | Jensen et al. | ............... | 370/280 |
| 6,795,509 B1 * | 9/2004 | Yamamoto et al. | ............... | 375/267 |
| 7,050,452 B2 * | 5/2006 | Sugar et al. | ............... | 370/465 |
| 7,161,476 B2 * | 1/2007 | Hardman et al. | ............... | 340/442 |
| 7,313,116 B2 * | 12/2007 | Lee et al. | ............... | 370/335 |
| 7,369,853 B2 * | 5/2008 | Son et al. | ............... | 455/436 |
| 7,391,714 B2 * | 6/2008 | Blasco Claret et al. | ............... | 370/208 |
| 7,664,129 B2 * | 2/2010 | Takagi et al. | ............... | 370/437 |
| 7,702,051 B2 * | 4/2010 | Lindenmeier et al. | ............... | 375/347 |
| 7,782,750 B2 * | 8/2010 | Yamaura et al. | ............... | 370/206 |
| 7,830,914 B1 * | 11/2010 | Chmara et al. | ............... | 370/468 |
| 8,073,398 B2 * | 12/2011 | Steer | ............... | 455/77 |
| 8,081,996 B2 * | 12/2011 | Kolavennu et al. | ............... | 455/509 |
| 8,111,683 B2 * | 2/2012 | Yamamoto et al. | ............... | 370/350 |
| 8,184,730 B2 * | 5/2012 | Talley et al. | ............... | 375/260 |
| 2002/0061031 A1 * | 5/2002 | Sugar et al. | ............... | 370/466 |
| 2003/0194986 A1 * | 10/2003 | Rainish et al. | ............... | 455/343.1 |
| 2003/0224731 A1 * | 12/2003 | Yamaura et al. | ............... | 455/63.3 |
| 2005/0018706 A1 * | 1/2005 | Myojo | ............... | 370/445 |
| 2005/0070320 A1 * | 3/2005 | Dent | ............... | 455/516 |
| 2005/0208956 A1 * | 9/2005 | Takagi et al. | ............... | 455/464 |
| 2005/0250469 A1 * | 11/2005 | Laroia et al. | ............... | 455/403 |
| 2005/0281200 A1 * | 12/2005 | Terreault | ............... | 370/241 |

(Continued)

FOREIGN PATENT DOCUMENTS

| | | |
|---|---|---|
| JP | 7-322355 | 12/1995 |
| JP | 2006-67507 | 3/2006 |

*Primary Examiner* — Hai V Nguyen
(74) *Attorney, Agent, or Firm* — Katten Muchin Rosenman LLP

(57) ABSTRACT

A base station device includes a transmission and reception unit, a no-communication time count unit, an assignment unit, and a duration adjustment unit. The transmission and reception unit transmits and receives user data to and from a mobile terminal. The no-communication time count unit counts the no-communication time in which the transmission and reception of the user data has been interrupted in the mobile terminal. When the no-communication time becomes longer than the duration in which the assignment of the frequency band to the mobile terminal is continued, the assignment unit releases the frequency band assigned to the mobile terminal. When the no-communication time is longer than the duration, and the no-communication time is shorter than the sum of the duration and the monitor time in which it is monitored whether the no-communication time continues after the release of the frequency band, the duration adjustment unit adjusts the duration.

9 Claims, 22 Drawing Sheets

U.S. PATENT DOCUMENTS

| | | | |
|---|---|---|---|
| 2006/0153141 A1* | 7/2006 | Hirano | 370/335 |
| 2007/0264992 A1* | 11/2007 | Maenpaa | 455/420 |
| 2008/0171520 A1* | 7/2008 | Steer | 455/77 |
| 2009/0168714 A1* | 7/2009 | Tanaka et al. | 370/329 |
| 2009/0196163 A1* | 8/2009 | Du | 370/204 |
| 2009/0219944 A1* | 9/2009 | Liang et al. | 370/431 |
| 2009/0232236 A1* | 9/2009 | Yamamoto et al. | 375/260 |
| 2009/0279529 A1* | 11/2009 | Hamalainen et al. | 370/350 |
| 2010/0136976 A1* | 6/2010 | Higashide | 455/436 |
| 2010/0202354 A1* | 8/2010 | Ho | 370/328 |
| 2010/0260275 A1* | 10/2010 | Talley et al. | 375/259 |
| 2010/0316067 A1* | 12/2010 | Chmara et al. | 370/468 |
| 2010/0329218 A1* | 12/2010 | Hoshino | 370/335 |
| 2011/0128895 A1* | 6/2011 | Sadek et al. | 370/280 |
| 2012/0120876 A1* | 5/2012 | Yamamoto et al. | 370/328 |
| 2013/0089208 A1* | 4/2013 | Fairey | 381/17 |

* cited by examiner

| ITEM | VALUE |
|---|---|
| INITIAL VALUE OF DURATION | T |
| GUARD TIMER | G |

F I G.  4 A

| ITEM | VALUE |
|---|---|
| INITIAL VALUE OF DURATION | T |
| GUARD TIMER | G |
| ADJUSTING METHOD WHEN DURATION IS TO BE REDUCED | 1/2 TIME |
| ADJUSTING METHOD WHEN DURATION IS TO BE EXTENDED | DOUBLE |

F I G.  4 B

| MOBILE TERMINAL ID | · · · | DURATION | · · · |
|---|---|---|---|
| UE11 | · · · | t11 | · · · |
| UE12 | · · · | t12 | · · · |
| · · · | · · · | · · · | · · · |

F I G. 5 A

| MOBILE TERMINAL ID | · · · | DURATION | · · · |
|---|---|---|---|
| UE1 | · · · | T | · · · |
| UE11 | · · · | t11 | · · · |
| UE12 | · · · | t12 | · · · |
| · · · | · · · | · · · | · · · |

F I G. 5 B

| MOBILE TERMINAL ID | · · · | DURATION | · · · |
|---|---|---|---|
| UE1 | · · · | t1 | · · · |
| UE11 | · · · | t11 | · · · |
| UE12 | · · · | t12 | · · · |
| · · · | · · · | · · · | · · · |

F I G. 5 C

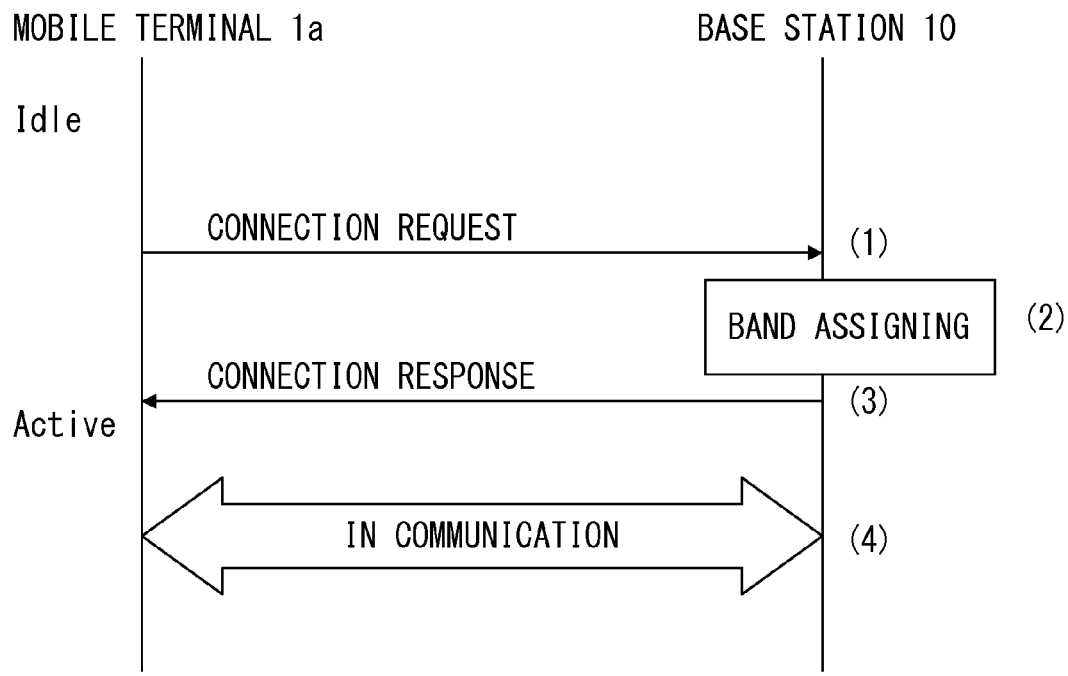
F I G. 6 A
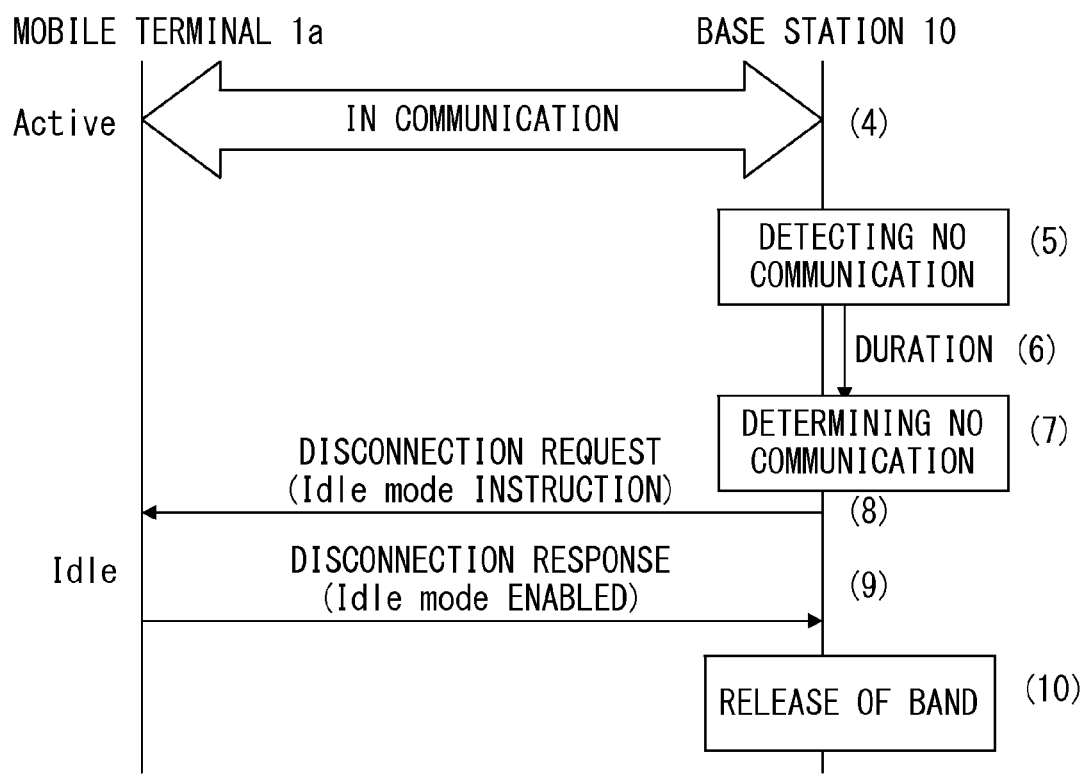
F I G. 6 B

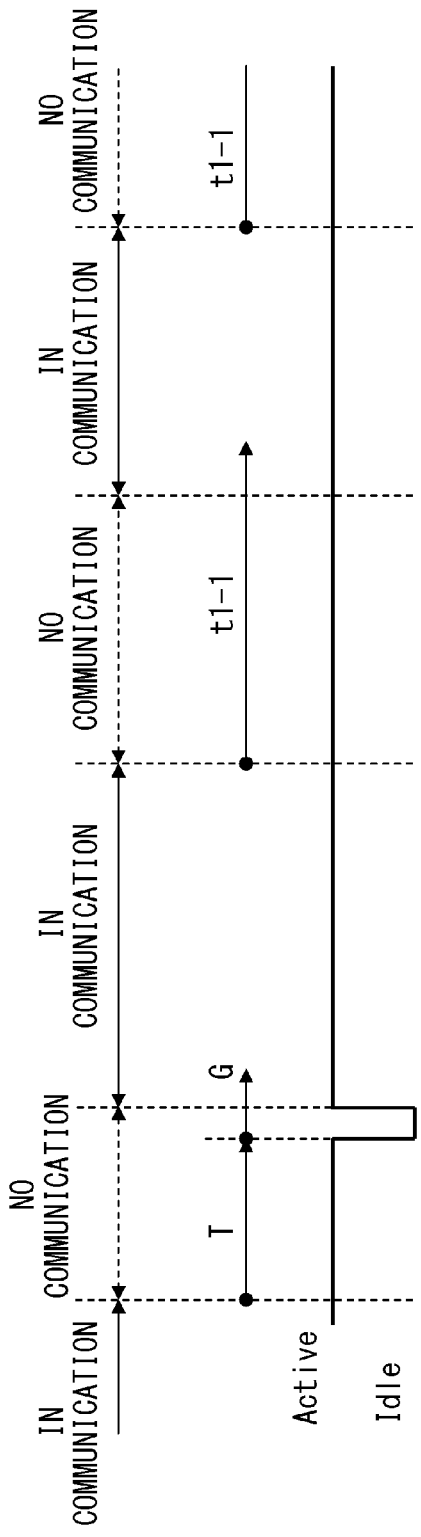
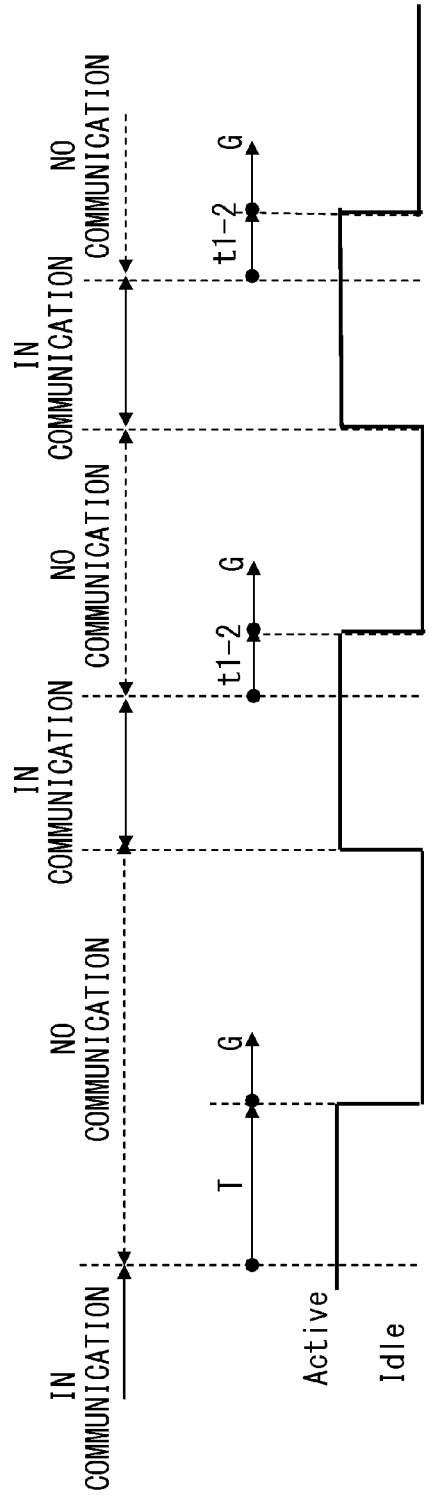
FIG. 8A
FIG. 8B

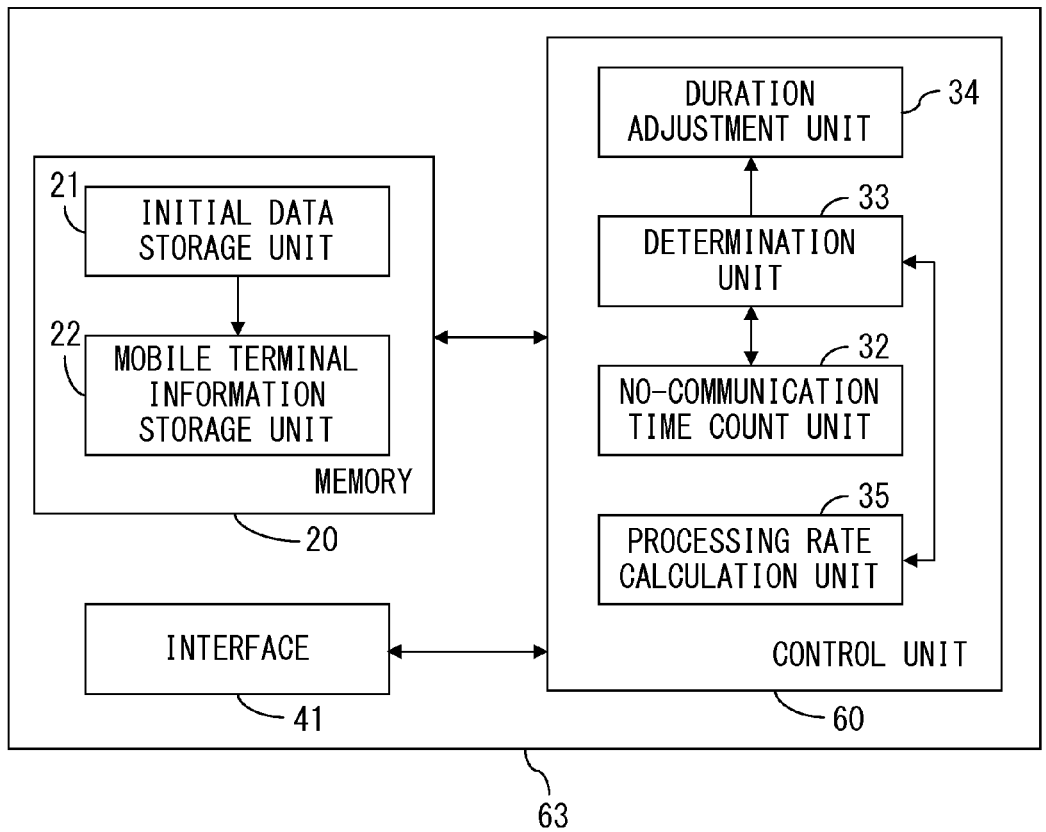
F I G. 1 3

| IDENTIFIER OF MOBILE TERMINAL | IDENTIFIER OF BASE STATION |
|---|---|
| UE1 | BS-a |
| UE2 | BS-a |
| UE3 | BS-c |
| UE4 | BS-f |
| . . . | . . . |

F I G. 1 4 A

| IDENTIFIER OF MOBILE TERMINAL | IDENTIFIER OF BASE STATION |
|---|---|
| UE1 | BS-a |
| UE2 | BS-a |
| UE3 | BS-d |
| UE4 | BS-f |
| . . . | . . . |

F I G. 1 4 B

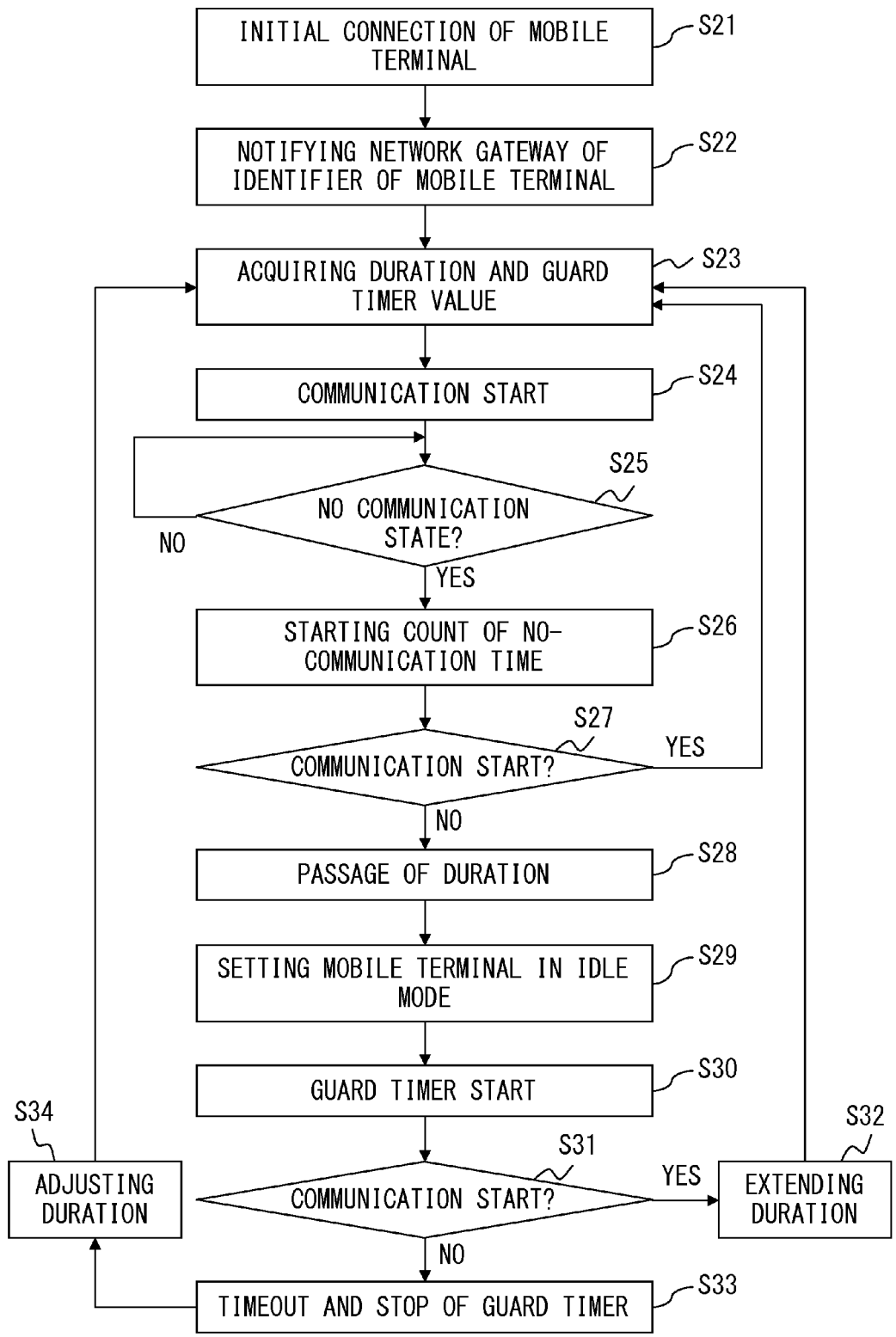
F I G. 1 5

| MOBILE TERMINAL ID | ... | DURATION | BASE STATION ID | ... |
|---|---|---|---|---|
| UE4 | ... |  | BS-e | ... |
| UE2 | ... | t2 | BS-a | ... |
| ... | ... | ... | ... | ... |

F I G. 1 6

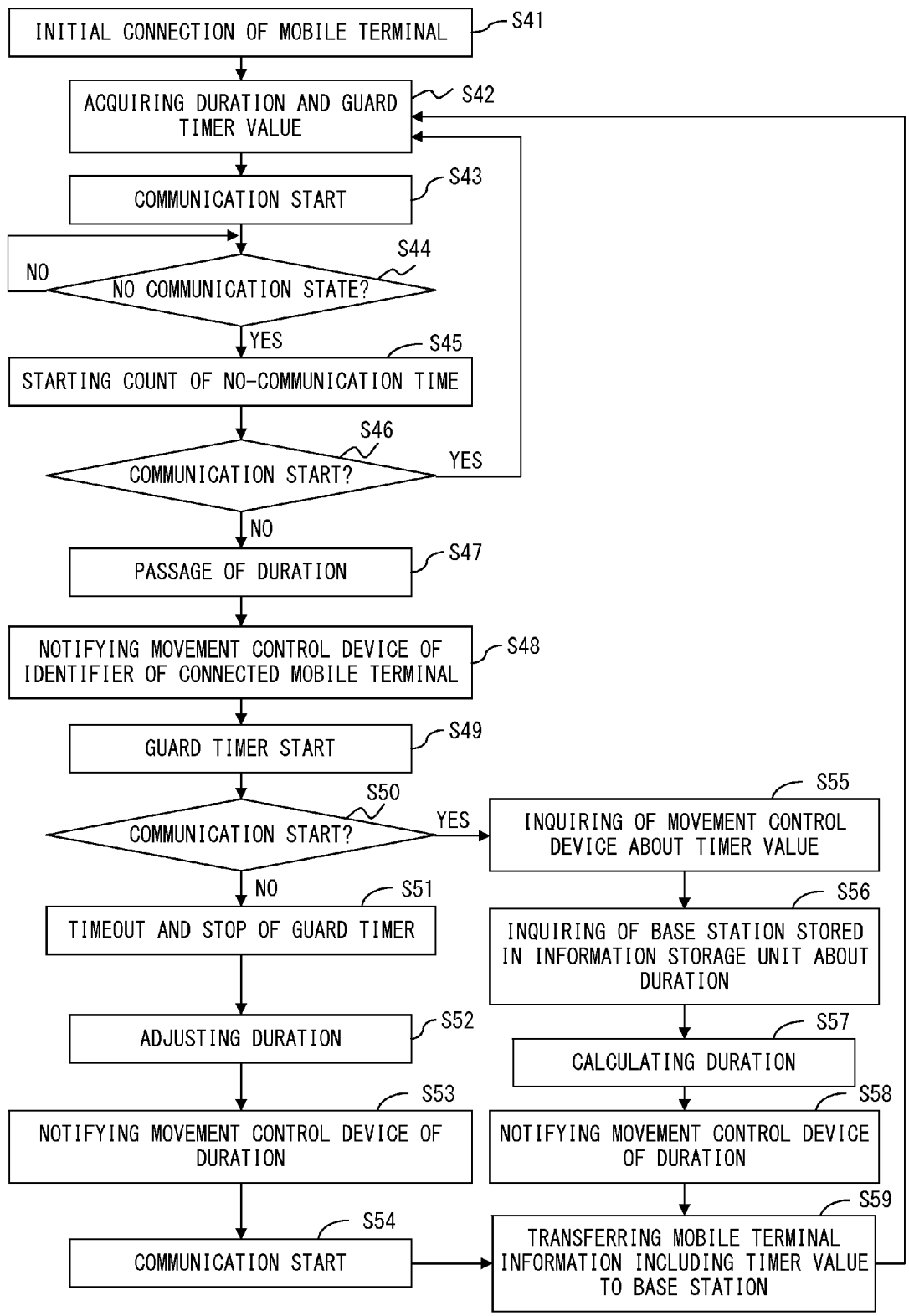
F I G. 17

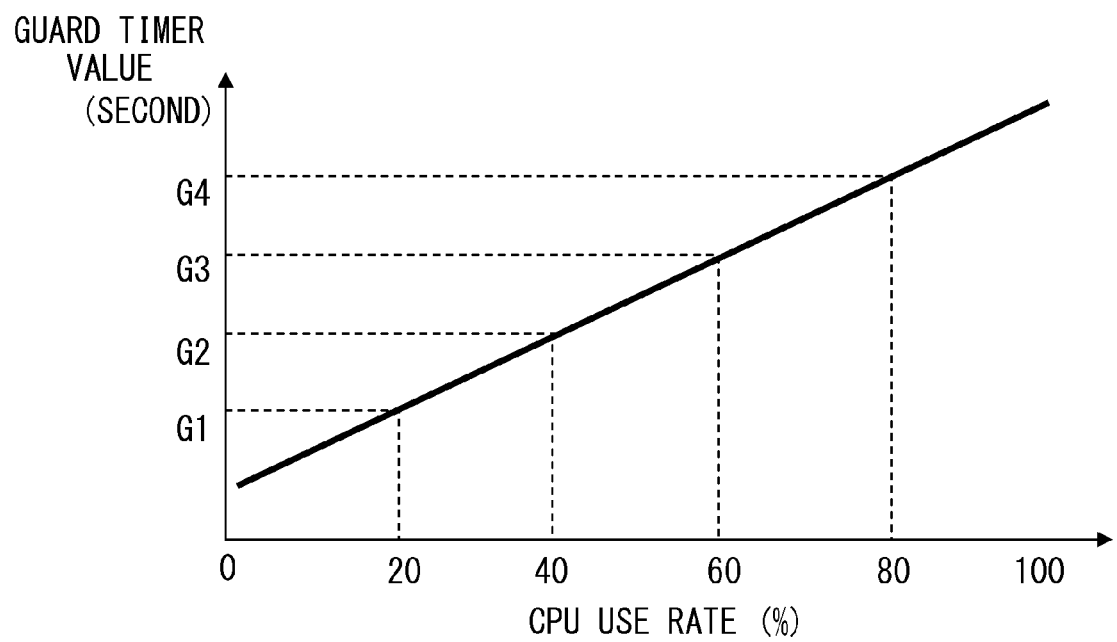
F I G. 19

| ITEM | VALUE |
|---|---|
| DURATION INITIAL VALUE | T |
| GUARD TIMER 1 | G1 |
| GUARD TIMER 2 | G2 |
| ... | ... |
| GUARD TIMER n-1 | Gn-1 |
| GUARD TIMER n | Gn |
| LOAD THRESHOLD 1 | 20 (%) |
| LOAD THRESHOLD 2 | 40 (%) |
| ... | ... |
| LOAD THRESHOLD n-1 | 80 (%) |

FIG. 20

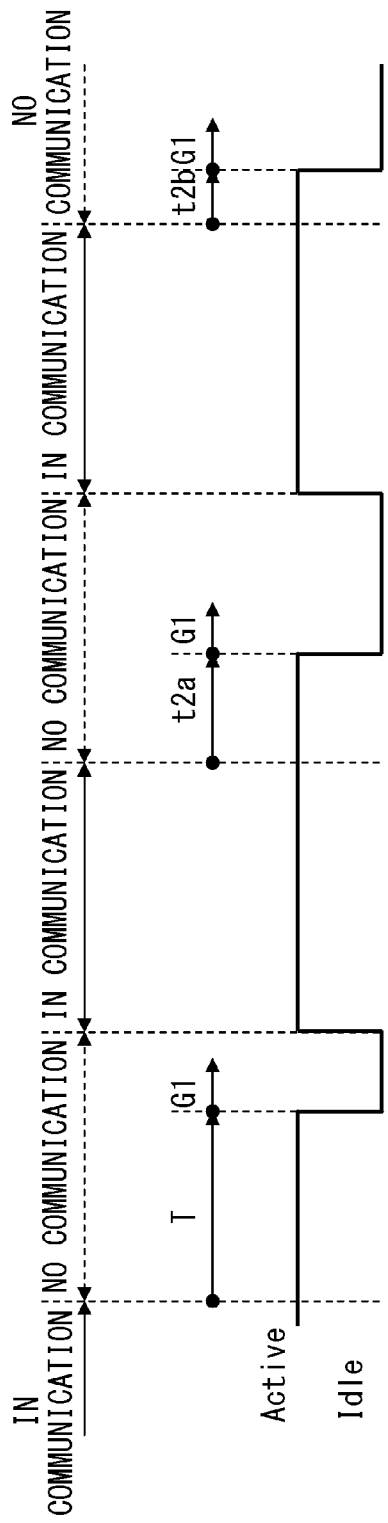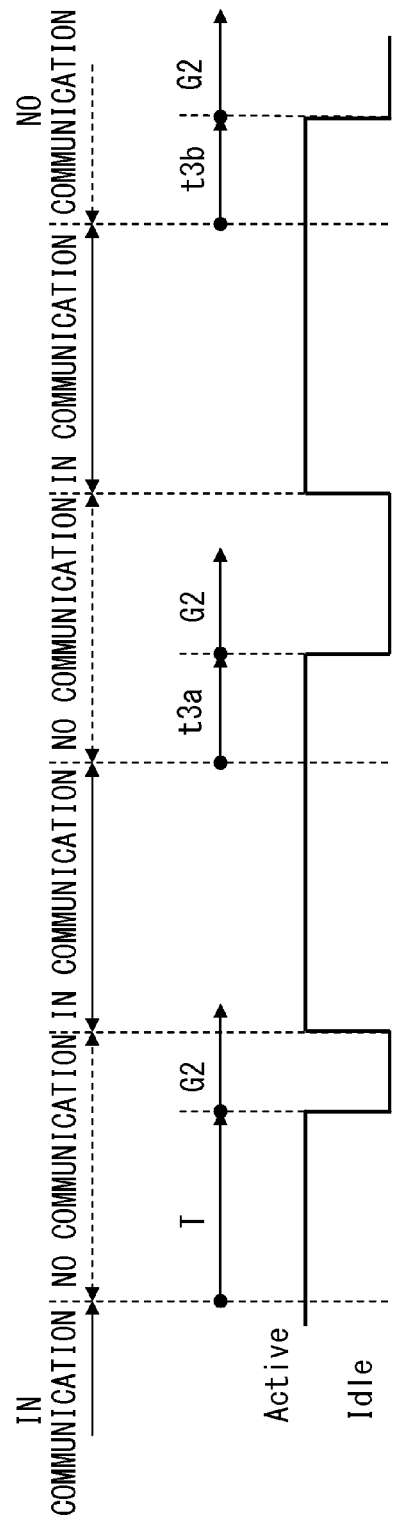

US 8,478,322 B2

WIRELESS COMMUNICATION APPARATUS AND BAND ASSIGNING METHOD

CROSS-REFERENCE TO RELATED APPLICATIONS

This application is based upon and claims the benefit of priority of the prior Japanese Patent Application No. 2010-127864, filed on Jun. 3, 2010, the entire contents of which are incorporated herein by reference.

FIELD

The present invention relates to a method of assigning a band to a mobile terminal.

BACKGROUND

Recently, the traffic of wireless communications has largely increased. However, since the frequency bands used in the wireless communications are finite, the improvement of the use efficiency of frequencies is demanded. To improve the use efficiency of frequencies, for example, an idle mode is adopted in a long term evolution (LTE), a worldwide interoperability for microwave access (WiMAX), etc.

FIG. 1 is an example of a configuration of a wireless frame used in the communication between a base station and a mobile terminal on a plane expressed by a frequency and time. The frame illustrated in FIG. 1 includes an area 101 (101a, 101b) used in the transmission and reception of control data, and a data area 102 used in the transmission and reception of user data. The data area 102 is not assigned to a mobile terminal which transmits or receives no user data. However, although no user data is transmitted or received, a mobile terminal in an active state transmits and receives control data with a base station. Therefore, it is assigned a frequency band used in transmitting and receiving control data as, for example, illustrated by 103a through 103f.

When an idle mode is set, a mobile terminal does not transmit or receive control data with a base station. In this case, since the frequency band assigned to the mobile terminal set in the idle mode is released, the released frequency band is assigned to another mobile terminal, thereby increasing the number of communicatable mobile terminals.

Described next is an example of a method of setting an idle mode. When a base station detects that no user data is transmitted or received in a mobile terminal, it activates a timer for monitoring a no communication status, and monitors whether or not user data is transmitted or received before the timeout of the timer. Unless the transmission and reception of user data are resumed before the timeout of the timer, the base station transmits a disconnection request (instruction to set the idle mode) to the mobile terminal. After transmitting the disconnection request, the base station releases the frequency band which has been assigned to the mobile terminal in the period in which has been assigned to the mobile terminal receiving the disconnection request. On the other hand, when the transmission and reception of the user data to and from the mobile terminal which is set in the idle mode are started, the base station performs a connecting process with the mobile terminal in which the transmission and reception of the user data have been resumed, and assigns a frequency band to the mobile terminal.

As related technology a communication system for storing the history of requested traffic from the past to the present and the history of the communication disconnection by a timeout, and predicting the communication status in the future based on the history of requested traffic is known. In this system, the time interval up to a timeout is calculated from the communication status in the future.

PRIOR ART DOCUMENT

Patent Document

[Patent Document 1] Japanese Laid-open Patent Publication No. 2006-67507

If the mobile terminal is set in the idle mode when the time of the no-communication monitor timer is up, and the timer value of the no-communication monitor timer is very high, then a frequency band is wastefully assigned to a mobile terminal which is not transmitting or receiving user data. On the other hand, if the timer value of the no-communication monitor timer is very low, the frequency assigned to a mobile terminal is improperly released when the transmission and reception of user data are interrupted only for a short time. In this case, since the base station repeats assigning and releasing a frequency band to a mobile terminal in a short time, a heavy load is imposed on the base station. Thus, the timer value of the no-communication monitor timer largely affects the use efficiency of frequencies, but it is hard to set an appropriate timer value.

In the communication system described above as the related technology, the time interval up to a timeout is calculated based on the history of requested traffic, but a traffic pattern cannot be easily specified in a packet communication. Therefore, the communication status in the future predicted based on the history of the requested traffic may not reflect the status of the communication actually performed in the future, and it is difficult to adjust the timer value using the history of the requested traffic.

SUMMARY

The base station device according to an embodiment includes a transmission and reception unit, a no-communication time count unit, an assignment unit, and a duration adjustment unit. The transmission and reception unit transmits and receives user data to and from a mobile terminal. The no-communication time count unit counts the no-communication time in which the transmission and reception of the user data has been interrupted in the mobile terminal. When the no-communication time becomes longer than the duration in which the assignment of the frequency band to the mobile terminal is continued, the assignment unit releases the frequency band assigned to the mobile terminal. When the no-communication time is longer than the duration, and the no-communication time is shorter than the sum of the duration and the monitor time in which it is monitored whether or not the no-communication time continues after the release of the frequency band, the duration adjustment unit adjusts the duration.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are examples of tables stored in an initial data storage unit.

FIGS. 5A through 5C are examples of tables stored in a mobile terminal information storage unit.

FIGS. 6A and 6B are examples of sequences in which a connection between a mobile terminal and a base station is established and a frequency band assigned to the mobile terminal is released.

FIGS. 8A and 8B illustrate examples of adjusting the duration according to the first embodiment.

FIG. 13 is an example of a configuration of a network gateway according to the third embodiment.

FIGS. 14A and 14B are examples of tables in which the identifier of a mobile terminal is associated with the identifier of a base station to which the mobile terminal is connected.

FIG. 15 is a flowchart for explanation of an example of the operation performed in the third embodiment.

FIG. 16 is an example of a table stored in an information storage unit.

FIG. 17 is a flowchart for explanation of an example of an operation performed in the fourth embodiment.

FIG. 19 is an example of the relationship between the load rate of a control unit and the optimum value of a guard timer.

FIG. 20 is an example of a table stored in an initial data storage unit.

FIGS. 22A and 22B are explanatory views of examples of operations of a base station when different guard timer values are used.

DESCRIPTION OF EMBODIMENTS

The embodiments are described below with reference to the attached drawings.

Figure 1:
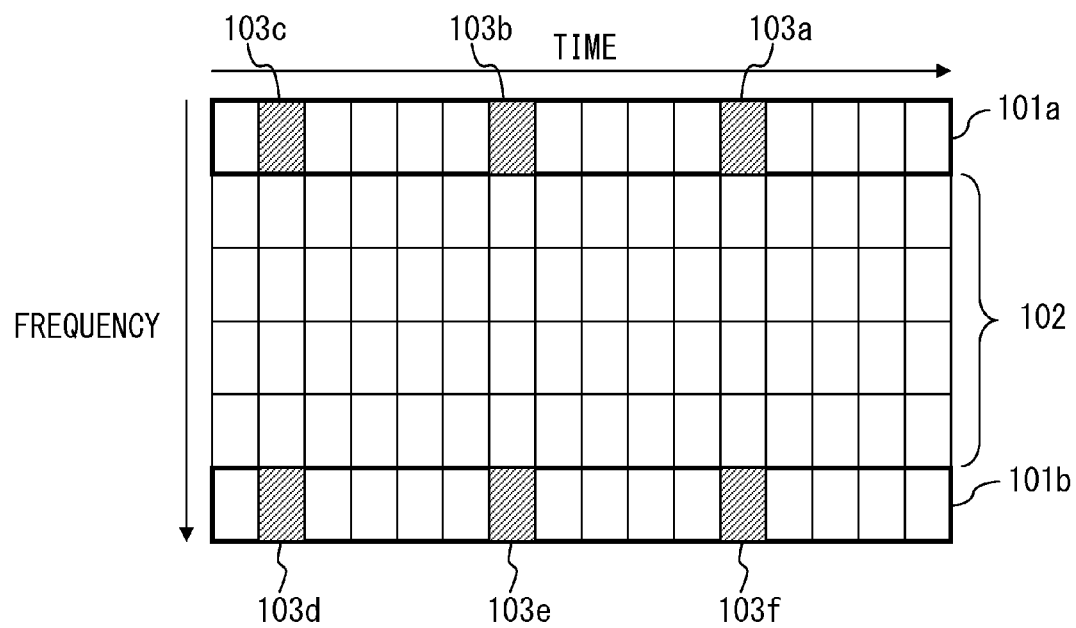
FIG. 1 is an example of a configuration of a wireless frame used in the communication between a base station and a mobile terminal on a plane expressed by a frequency and time.
Figure 2:
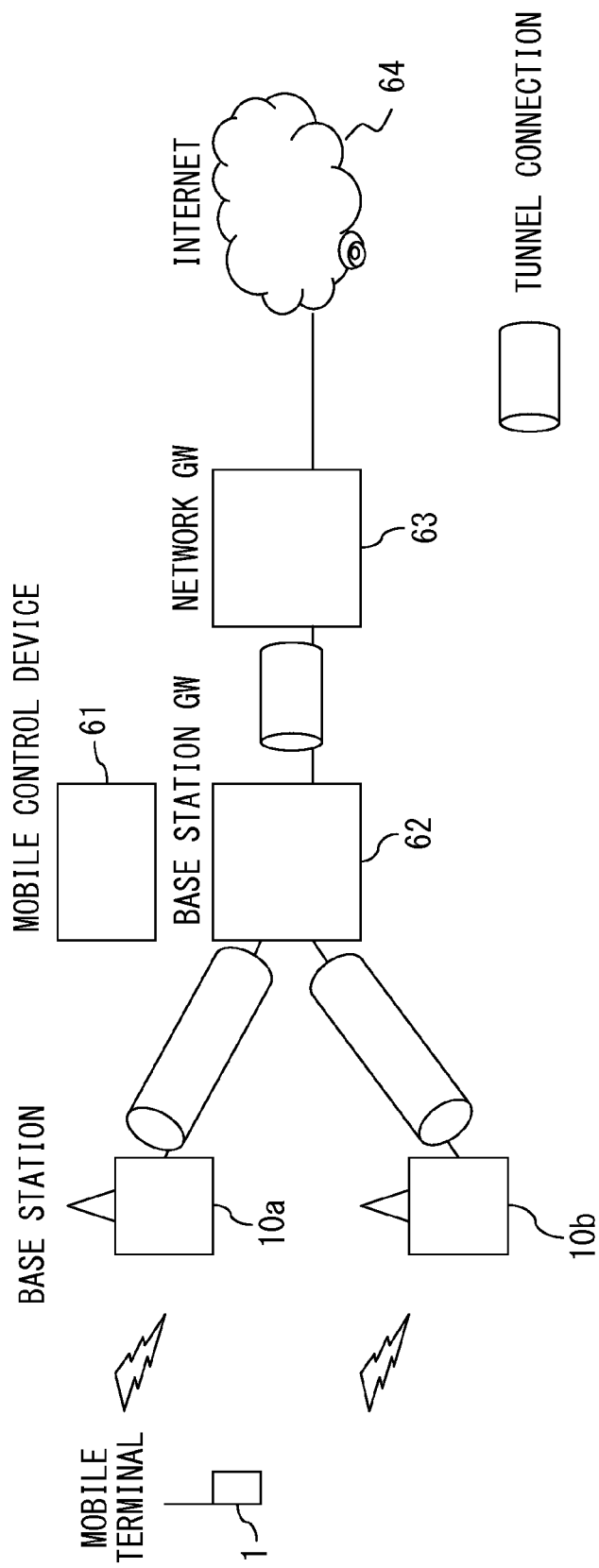
FIG. 2 is an example of a network to which an embodiment can be applied.

FIG. 2 is an example of a network to which an embodiment can be applied. The network includes a base station 10 (10a, 10b), a mobile control device 61, a base station gateway 62, and a network gateway 63. The base station gateway 62 connects a base station to a core network. The network gateway 63 connects the base station gateway 62 to an external network such as Internet 64 etc. A mobile terminal 1 transmits and receives data to and from a communication partner device through a base station 10a when it enters the communication area of the base station 10a.

It is assumed that the base station gateway 62 stores in memory the identifier etc. of a lower base station connected to the base station gateway 62. Similarly, the network gateway 63 stores the identifier of the connected base station gateway 62. Depending on the capacity of the memory provided for the network gateway 63, the network gateway 63 can also store the identifier of a lower base station. In addition, the base station 10 stores the identifier of the base station gateway 62 to which the base station is connected.

The network illustrated in FIG. 2 is an example. For example, an embodiment can be applied to a network in which the base station 10a is connected to another base station 10c (not illustrated in the attached drawings) by cable. In this case, it is assumed that the base station 10a stores in the memory (for example, in memory 20 illustrated in FIG. 3) the identifiers of the connected base station 10c, the base station gateway 62, etc. In addition, the present embodiment can also be applied in the network in which another base station gateway 62a (not illustrated in the attached drawings) is connected to the base station gateway 62. In this case, the base station gateway 62 can store the identifier etc. of the base station gateway 62a in the memory.

In the network illustrated in FIG. 2, a tunneling system is used in transmitting and receiving data between the base station 10 and the base station gateway 62 to continue the communication of the mobile terminal 1 which moves between base stations. Similarly, data is transmitted and received in the tunneling system between the base station gateway 62 and the network gateway 63. Therefore, although the mobile terminal 1 switches the connected base station from the base station 10a to the base station 10b, the mobile terminal 1 can communicate with the communication partner device. In addition, as described later, the base station 10, the base station gateway 62, or the network gateway 63 can monitor whether or not the mobile terminal 1 is transmitting or receiving user data. The set tunnel connection is set for each mobile terminal.

The network illustrated in FIG. 2 can be a network in accordance with any standard such as the LTE, WiMAX, 3rd generation (3G), etc. For example, the base station gateway 62 can be a serving gateway (S-GW) of the LTE, a serving general packet radio service support node (SGSN) of the 3G, an access service gateway (ASN-GW) of the WiMAX, etc. The network gateway 63 is, for example, a packet data network gateway (P-GW) of the LTE, a gateway general packet radio service support node (GGSN) of the 3G, a home agent of the WiMAX, etc.

First Embodiment

Figure 3:
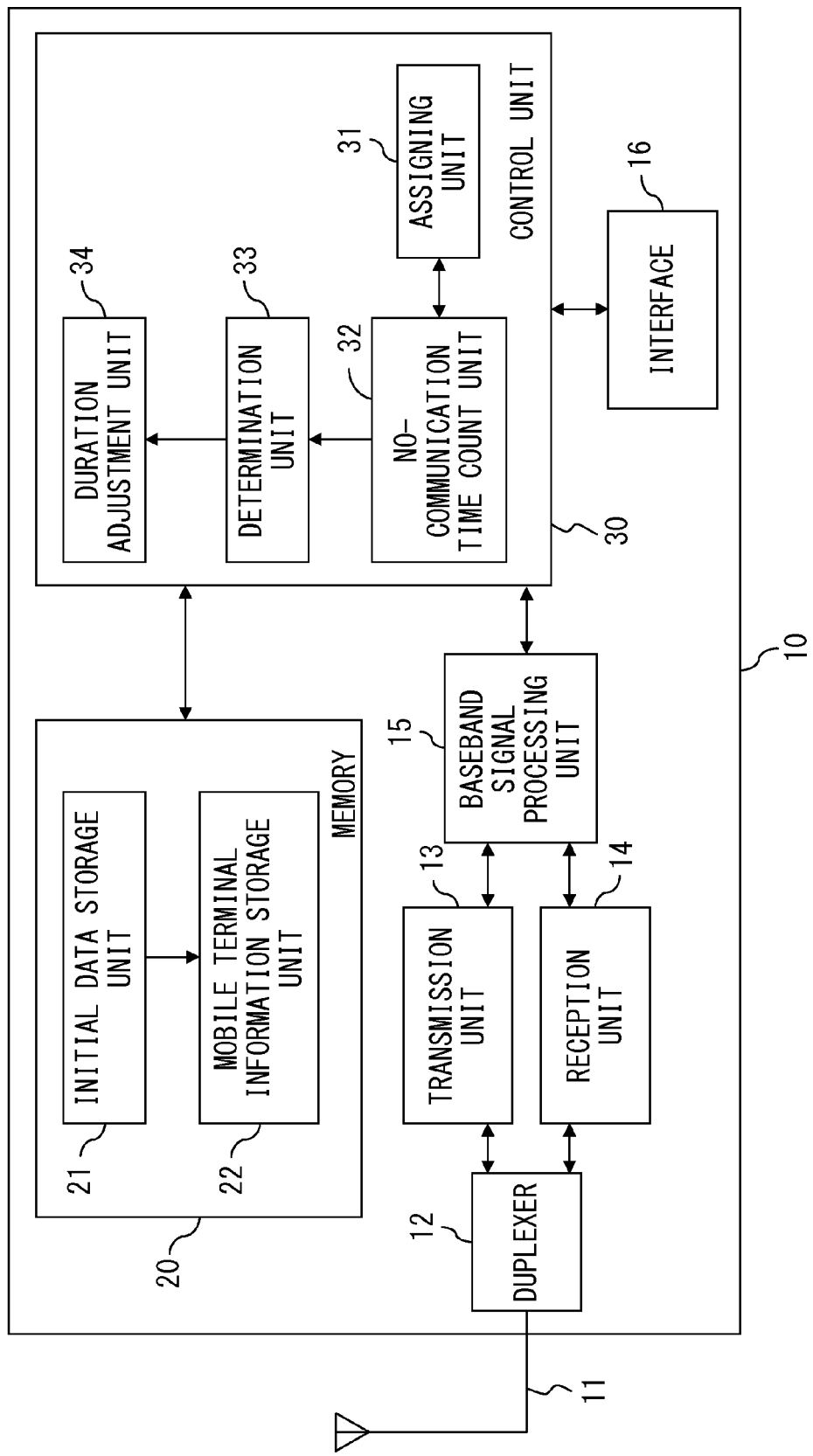
FIG. 3 is an example of a configuration of a base station according to the first embodiment.

FIG. 3 is an example of a configuration of the base station 10 according to the first embodiment. The base station 10 is provided with an antenna 11, a duplexer 12, a transmission unit 13, a reception unit 14, a baseband signal processing unit 15, an interface 16, memory 20, and a control unit 30. The memory 20 is provided with an initial data storage unit 21 and a mobile terminal information storage unit 22. The control unit 30 is provided with an assigning unit 31, a no-communication time count unit 32, a determination unit 33, and a duration adjustment unit 34.

The duplexer 12 connects the transmission unit 13 and the reception unit 14 to the antenna 11. The duplexer 12 connects the antenna 11 to the transmission unit 13 when the data such as the control data for notification of the assignment of a frequency band is transmitted from the base station 10 to the mobile terminal 1. The duplexer 12 connects he antenna 11 to the reception unit 14 when the base station 10 receives data such as user data, control data, etc. from the mobile terminal 1. The transmission unit 13 performs the process for transmitting a signal to the mobile terminal 1 etc. by, for example, multiplying a signal input from the baseband signal processing unit 15 by a carrier wave, etc. The reception unit 14 generates a baseband signal excluding the carrier wave from the input high frequency, and outputs the generated baseband signal to the baseband signal processing unit 15. The baseband signal processing unit 15 outputs received data to the control unit 30. The interface 16 is used by the base station 10 communicating with other base stations 10, base station gateway 62, etc.

The no-communication time count unit 32 acquires the duration in which the frequency band is assigned to the mobile terminal 1 from the memory 20. The duration refers to the period in which the assignment of the frequency band for communicating control data with the mobile terminal 1 is continued although the transmission and reception of user data are interrupted between the mobile terminal 1 and the base station 10. The duration is set for each mobile terminal depending on the length of the communication waiting time between the mobile terminal 1 and its communication partner device.

The no-communication time count unit 32 counts the time period in which the mobile terminal 1 does not transmit or receive user data to or from the base station 10. In the following description, the time period in which the mobile terminal 1 does not communicate user data may be described as "no-communication time". For example, the no-communication time can be the time period from the transmission of user data from the base station 10 to the mobile terminal 1 to the next transmission of data from the base station 10 to the mobile terminal 1. The no-communication time can also be the time period from the transmission of user data from the base station 10 to the mobile terminal 1 to the transmission of data from the mobile terminal 1 to the base station 10. Furthermore, the no-communication time can be a time period from the arrival of user data transmitted from the mobile terminal 1 to the base station 10 to the transmission of data from the base station 10 to the mobile terminal 1. Furthermore, the no-communication time can be a time period from the arrival of user data transmitted from the mobile terminal 1 to the base station 10 to the transmission of next data from the mobile terminal 1 to the base station 10.

The no-communication time count unit 32 notifies the assigning unit 31 of the count value and the identifier of the mobile terminal 1 when the count value matches the duration. Therefore, the no-communication time count unit 32 notifies the assigning unit 31 of the identifier of the mobile terminal 1 in which no-communication time exceeds or matches the duration. For example, when the mobile terminal 1*a* does not communicate user data for a time period longer than the duration set in the mobile terminal 1*a*, the identifier of the mobile terminal 1*a* is reported to the assigning unit 31. The assigning unit 31 releases the frequency band assigned to the mobile terminal 1 to which the no-communication time count unit 32 reported the identifier. The assigning unit 31 can appropriately assign the released frequency band to another mobile terminal 1.

Furthermore, when the transmission and reception of user data is resumed between the mobile terminal 1 and the base station 10, the no-communication time count unit 32 notifies the assigning unit 31 and the determination unit 33 of the count value and the identifier of the mobile terminal 1. When the transmission and reception of the user data is resumed after the frequency band is released, the assigning unit 31 determines for the mobile terminal 1*a* the frequency band used by the mobile terminal 1*a* in the transmission and reception of the user data and the control data and the time period in which the band is used. In the following description, the no-communication time count unit 32 counts the no-communication time by a timer provided for the unit.

Upon receipt of the notification from the no-communication time count unit 32, the determination unit 33 determines the method of adjusting the duration depending of the length of the no-communication time. For example, the determination unit 33 determines to extend the duration when the no-communication time is longer than the duration and the no-communication time is shorter than the sum of the duration and the monitor time. The determination unit 33 determines to reduce the duration when the no-communication time is longer than the sum of the duration and the monitor time. The determination unit 33 notifies the duration adjustment unit 34 of the determined method.

The duration adjustment unit 34 adjusts the duration in the method notified by the determination unit 33. The operations of the assigning unit 31, the no-communication time count unit 32, the determination unit 33, and the duration adjustment unit 34 are described later in detail.

The monitor time indicates the time period in which it is monitored whether or not the no-communication time is continued after releasing the frequency band. The monitor time is set depending on the processing load of the base station 10 and the number of mobile terminals 1 connected to the base station 10. The monitor time can be set as associated with the length of the duration, and for example, a value exceeding the duration in which the processing load of the base station 10 is in a predetermined range is set as the monitor time. In the following description, when the monitor time is set as a value equal to the minimum value of the duration in which the processing load of the base station 10 can be within a predetermined range, the value of the monitor time can be described as a guard timer value or a guard timer. Therefore, the guard timer value is an example of a monitor time, and the minimum value of the duration which can be set in the mobile terminal 1. The processing load of the base station 10 is set to an arbitrary value by an operator etc. depending on the configuration of the base station 10.

The control unit 30 appropriately operates using the data stored in the memory 20. The memory 20 is provided with the initial data storage unit 21 and the mobile terminal information storage unit 22. The memory 20 is used in executing a program etc. The memory 20 appropriately stores data etc. used in operating the base station 10.

FIGS. 4A and 4B are examples of tables (initial data table) stored in an initial data storage unit 21. As illustrated in FIG. 4A, the initial data storage unit 21 stores the initial value of the duration and the guard timer value. The duration adjustment unit 34 sets the initial value of the duration stored in the initial data storage unit 21 as an initial value of the duration to be used in the communication with the mobile terminal 1. FIGS. 4A and 4B are examples of tables, and the information stored in the initial data storage unit 21 can be arbitrarily changed depending on the implementation. For example, since a guard timer value is an example of a monitor time, the initial data storage unit 21 may store the value of a monitor time other than the guard timer value. In the description below, the base station 10 operates using the initial data table illustrated in FIG. 4A, and the monitor time is a guard timer value.

FIGS. 5A through 5C are examples of tables stored in the mobile terminal information storage unit 22. The mobile terminal information storage unit 22 stores the duration associated with the identifier of a mobile terminal for each mobile terminal which communicates with the base station 10. The duration stored in the mobile terminal information storage unit 22 is the duration obtained by the duration adjustment unit 34. However, before the duration for the mobile terminal 1 is adjusted after the mobile terminal 1 is connected to the base station 10, the initial value stored in the initial data storage unit 21 is stored in the mobile terminal information storage unit 22. FIGS. 5A through 5C are examples of tables stored in the mobile terminal information storage unit 22, and the information stored in the mobile terminal information storage unit 22 can be arbitrarily changed depending on the implementation. For example, the mobile terminal information storage unit 22 can store a parameter used in the mobility control of the mobile terminal 1 and the management of the security, and the information used in the quality of service (QoS) control, etc.

Described below is an example of the operation of the base station 10 according to the first embodiment. In the following example, the base station 10 newly starts the communication with the mobile terminal (mobile terminal 1a) whose identifier is UE1. The base station 10 is communicating with the mobile terminals whose identifiers are UE11 and UE12, and it is assumed that the mobile terminal information storage unit 22 holds a table illustrated in FIG. 5A.

FIG. 6A is an example of a sequence when the connection between the mobile terminal 1a assigned the identifier of the UE1 and the base station 10 is established. With reference to FIG. 6A, the procedures (1) through (4) are described.

(1) When the mobile terminal 1a is activated in the communication area of the base station 10, the mobile terminal 1a transmits a connection request message to the base station 10.

(2) When the base station 10 receives the connection request message, the assigning unit 31 assigns a frequency band and time for transmission and reception of control data and user data to the mobile terminal 1a. The control unit 30 stores the identifier (UE1) of the mobile terminal 1a and the duration in the mobile terminal information storage unit 22. Since the duration is not adjusted in the mobile terminal 1a, the initial value T of the duration stored in the initial data storage unit 21 is set as the duration of the mobile terminal 1a as illustrated in FIG. 5B. On the other hand, since duration has been calculated for the mobile terminals whose identifiers are UE11 and UE12, t11 and t12 are stored in the mobile terminal information storage unit 22.

(3) The base station 10 transmits a connection response message to the mobile terminal 1a. The connection response message includes the information specifying the frequency band assigned to the mobile terminal 1a and the time to which the frequency band is assigned.

(4) The communication is performed between the mobile terminal 1a and the base station 10.

FIG. 6B is an example of a sequence when the no-communication time between the mobile terminal 1a and the base station 10 is longer than the duration, and the frequency band assigned to the mobile terminal 1a is released. The example is described below with reference to FIG. 6B.

(5) When the transmission and reception of the user data between the base station 10 and the mobile terminal 1a is interrupted, the control unit 30 stops assigning the frequency band used in the transmission and reception of user data to the mobile terminal 1a. Furthermore, the control unit 30 notifies the no-communication time count unit 32 that the transmission and reception of the user data in the mobile terminal 1a have been interrupted. The no-communication time count unit 32 starts counting the no-communication time of the mobile terminal 1a. In addition, the no-communication time count unit 32 acquires the duration T set for the mobile terminal 1a from the mobile terminal information storage unit 22.

(6) The no-communication time count unit 32 compares the count value of the no-communication time with the duration set for the mobile terminal 1 to be counted. In this example, the no-communication time of the mobile terminal 1a is compared with the duration T set for the mobile terminal 1a.

(7) When the no-communication time is longer than the duration, the no-communication time count unit 32 notifies the assigning unit 31 that the no-communication time is equal to or longer than the duration. In this case, the no-communication time count unit 32 notifies the assigning unit 31 also of the identifier of the mobile terminal 1 whose no-communication time matches or exceeds the duration. For example, if the count value of the no-communication time of the mobile terminal 1a is 10 ms when the initial value T of the duration is 10 ms, then the no-communication time count unit 32 notifies the assigning unit 31 of the information that the no-communication time of the mobile terminal 1a is longer than the duration, and the identifier of the mobile terminal 1a. The no-communication time count unit 32 continues the count of the no-communication time.

Upon receipt of the notification, the assigning unit 31 determines the release of the frequency band assigned to the mobile terminal 1a. The assigning unit 31 notifies the control unit 30 of the information including the release of the frequency band, and the identifier (UE1) of the mobile terminal 1a.

(8) The control unit 30 transmits a disconnection request message to the mobile terminal 1a specified by the notified identifier. The disconnection request message can be any message instructing the transfer to the idle mode.

(9) The mobile terminal 1a returns the disconnection response message to the base station 10. Then, the mobile terminal 1a transfers to the idle mode as illustrated by A in FIG. 7.

(10) When the base station 10 receives the disconnection response message, the control unit 30 notifies the assigning unit 31 that the mobile terminal 1a has entered the idle mode. Then, the assigning unit 31 releases the frequency band assigned to the mobile terminal 1a. Here, the frequency band used in the transmission and reception of control data is released.

(11) The no-communication time count unit 32 continues counting the no-communication time until the transmission and reception of the user data is resumed in the mobile terminal 1a.

(12) When the base station 10 receives data addressed to the mobile terminal 1a or when the mobile terminal 1a transmits data to the base station 10, the operations of the above-mentioned procedures (1) and (2) are performed. When the transmission and reception of user data are resumed, the no-communication time count unit 32 notifies the assigning unit 31 that the transmission and reception of the user data have been resumed. The no-communication time count unit 32 also notifies the determination unit 33 of the count result of the no-communication time with the identifier of the mobile terminal 1a.

(13) Upon receipt of the notification that the transmission and reception of the user data have been resumed, the determination unit 33 acquires a guard timer value (G) from the initial data storage unit 21. Furthermore, the determination unit 33 compares the count result notified with the notification of the resumption of the transmission and reception of the user data with the duration. And the determination unit 33 also compares the count result with a sum of the duration and the guard timer value. Furthermore, depending on the comparison result, the determination unit 33 determines the method of adjusting the duration.

An example of the operation of the control unit 30 from the release of the frequency band to the determination of the duration is described below with reference to FIG. 7. The method described here is an example of a method of adjusting the duration, and an operation for adjusting the duration can be variously changed.

Figure 7:
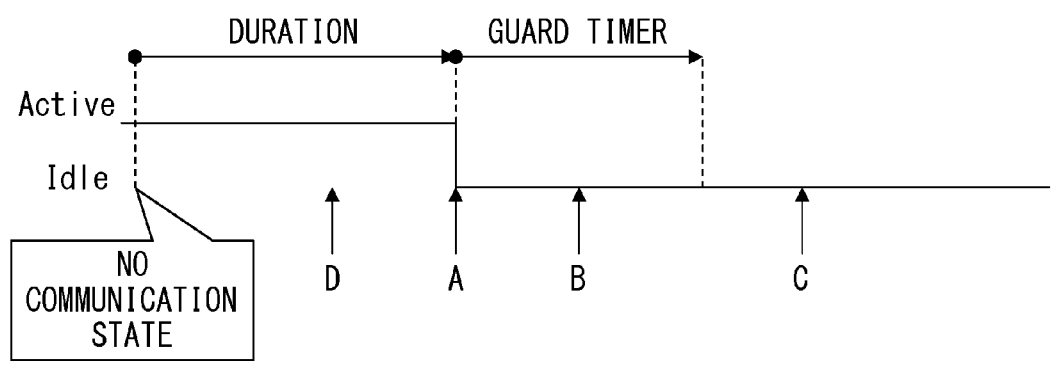
FIG. 7 illustrates an example of a method of determining a duration adjusting method.

When the transmission and reception of user data are resumed at the time point of B in FIG. 7, the no-communication time is longer than the duration T, and shorter than a total value (T+G) of the duration and the guard timer value. If the duration for the mobile terminal 1*a* is set as a value larger than T+G, the mobile terminal 1*a* does not enter the idle mode although the no-communication time between the mobile terminal 1*a* and the base station 10 continues up to B. If the duration is T+G, it is not determined that the frequency band is released in the procedure (7). Therefore, if the duration is T+G, the frequency band assigned to the mobile terminal 1*a* has not been released. When the frequency band is not released, the assignment of the frequency band used in transmitting the control data to the mobile terminal 1*a* in the procedure (12) is not assigned. That is, if the duration set in the mobile terminal 1*a* is T+G, the processing load of the control unit 30 and the base station 10 is small by the process of reassigning the frequency band for the transmission and reception of the control data to the mobile terminal 1*a*. Then, the determination unit 33 determines to increase the duration of the mobile terminal 1*a*.

On the other hand, when the transmission and reception of the user data are resumed at the time point of C in FIG. 7, the no-communication time is longer than the total value (T+G) of the duration and the guard timer value. In this case, since the no-communication time is long, the time period in which the frequency band is wastefully assigned to the mobile terminal 1*a* is longer than when the communication is resumed at the time point of B. If the duration is longer than the guard timer value, there is the possibility that the processing load on the base station 10 is not too heavy with respect to the performance of the base station 10 even if the duration is shorter than the current set value. Therefore, to improve the use efficiency of the frequency band, the determination unit 33 determines to decrease the duration from the current set value of T.

(14) The determination unit 33 notifies the duration adjustment unit 34 of the method of adjusting the duration. The duration adjustment unit 34 changes the duration according to the notified adjusting method. For example, the duration adjustment unit 34 can double the duration. When the duration is to be shorter, it can be halved.

Since the guard timer value is the minimum value of the duration, the determination unit 33 adjusts the duration so that the duration is not shorter than the guard timer value. The duration adjustment unit 34 compares the adjusted value of the duration with the guard timer value, and does not change the duration when the adjusted value is equal to or lower than the guard timer value. For example, when the time period of a half of the set duration is equal to or higher than the guard timer value, the duration is updated to the half of the duration. On the other hand, when the time period of half of the currently set duration is shorter than the guard timer value, the duration is not changed. The duration adjustment unit 34 stores the adjustment result of the duration in the mobile terminal information storage unit 22. For example, when the duration of the mobile terminal 1*a* is adjusted to t1, the data stored in the mobile terminal information storage unit 22 is changed as illustrated in FIG. 5C.

(15) The procedures (4) through (14) are repeated until the communication between the mobile terminal 1*a* and the base station 10 is completed.

As in the case of D in FIG. 7, when the no-communication time of the mobile terminal 1*a* is shorter than the duration, the mobile terminal 1*a* resumes the communication before it is placed in the idle mode. Therefore, the processes after the procedure (7) are not performed, and the transmission and reception of the user data in the mobile terminal 1*a* are resumed. When the length of the no-communication time is shorter than the duration, the no-communication time count unit 32 notifies the determination unit 33 that the transmission and reception of the user data have been resumed. The determination unit 33 compares the no-communication time with the duration, and when it determines that the no-communication time is shorter than the duration, it determines not to change the duration. The determination unit 33 notifies the duration adjustment unit 34 of no change of the duration. Then, the duration adjustment unit 34 does not change the set duration.

FIGS. 8A and 8B are examples of adjusting the duration according to the first embodiment. FIGS. 8A and 8B illustrate the result of adjusting the duration performed in the procedures (13) through (15). In FIG. 8A, the first no-communication time of the mobile terminal 1 is shorter than the total (T+G) of the duration T and the guard timer value G, and longer than the duration. Then, the determination unit 33 determines to increase the duration, and the duration adjustment unit 34 adjusts the duration at t1–1. As t1–1 is longer than the next no-communication time, the duration of the mobile terminal 1 is not adjusted, and the duration is held as t1–1.

On the other hand, as illustrated in FIG. 8B, if the first no-communication time of the mobile terminal 1 is longer than the total (T+G) of the duration and the guard timer value, the determination unit 33 determines to decrease the duration, and the duration adjustment unit 34 adjusts the duration as t1–2. Since the next no-communication time in the mobile terminal 1 is longer than the total of the duration (t1–2) and the guard timer value, the determination unit 33 determines to decrease the duration. The duration adjustment unit 34 compares t1–2 with the guard timer value G. It is assumed that t1–2 is equal to the guard timer value. Then, the duration adjustment unit 34 does not adjust the duration.

As described above, the base station 10 according to the present embodiment changes the length of the duration depending on the result of the comparison between the length of no-communication time and duration and the result of the comparison between the length of the no-communication time and the total of the duration and the guard timer value. The determination unit 33 determines whether or not the processing load of the base station 10 when the duration is changed is too heavy for the base station 10 depending on whether or not the no-communication time is longer than the total of the duration and the guard timer value. That is, the determination unit 33 uses the guard timer value as an index for determining the level of the processing load of the base station 10. Therefore, the frequency band assigned to the mobile terminal 1 which is not transmitting or receiving user data is released at an early stage on condition that the load of the base station 10 does not become heavier. Therefore, according to the present embodiment, the frequency band can be effectively used without increasing the processing load of the base station 10.

Since the duration is set for each mobile terminal, the duration can be set depending on the status of the communication performed in each mobile terminal 1. Therefore, the duration can be set depending on various factors which fluctuate the traffic pattern such as the used application, the terminal type of the mobile terminal 1, the use frequency of users, the congestion of a line, etc. Thus, the frequency band can be effectively assigned by setting an appropriate duration in each mobile terminal 1, and not assigning the frequency band to the mobile terminal 1 whose no-communication time exceeds the duration.

In the description above, the case in which the duration adjustment unit 34 halves or doubles the set duration is described as an example. However, it is an example only, and an arithmetic method can be arbitrarily changed. That is, when the duration is extended, the duration adjustment unit 34 can calculate a new duration by multiplying the duration by any positive number larger than 1. Similarly, when the duration adjustment unit 34 reduces the duration, the duration adjustment unit 34 can calculate a new duration by multiplying the duration by any positive number smaller than 1. In addition, the duration adjustment unit 34 can adjust the duration by adding or subtracting any number to or from the set duration. For example, the duration adjustment unit 34 can set as a new duration the value obtained by subtracting the guard timer value from the set duration.

The operation performed when the duration is adjusted can set using the initial data storage unit 21 by an operator etc. The initial data table in FIG. 4B includes the initial value of the duration, the guard timer value, and the method of changing the duration. In this case, the duration adjustment unit 34 adjusts the duration by the method stored in the initial data storage unit 21 when the determination unit 33 instructs the duration adjustment unit 34 to adjust the duration.

In the description above, the no-communication time count unit 32 counts the no-communication time until the transmission and reception of user data is resumed. However, the no-communication time count unit 32 can monitor whether or not the transmission and reception of the user data are resumed in the total time period of the duration and the guard timer value.

Figure 9:
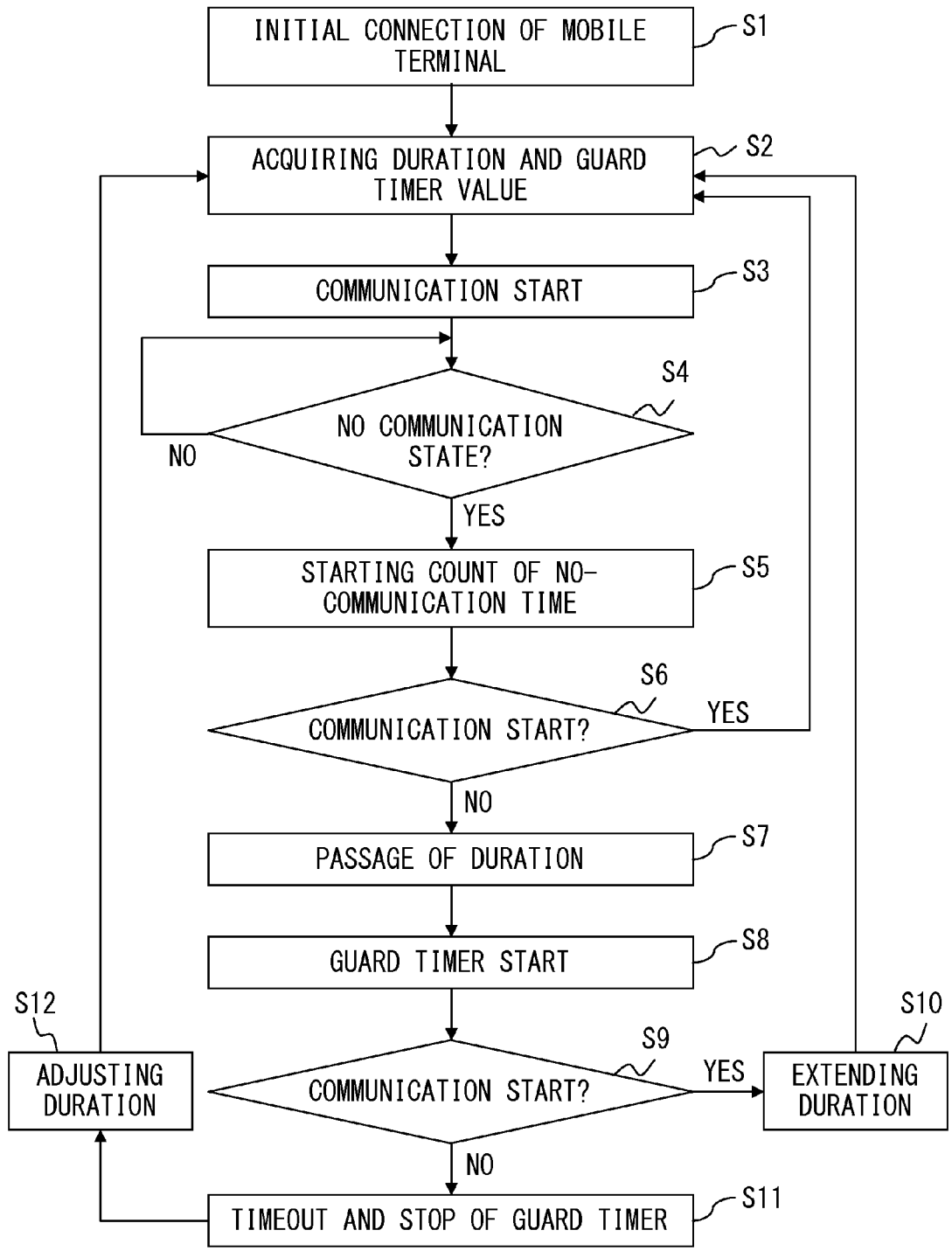
FIG. 9 is a flowchart of an example of an operation of a base station according to the first embodiment.

FIG. 9 is a flowchart of an example of an operation of the base station 10. Here, the operation of the base station 10 is explained about a case where the no-communication time count unit 32 monitors the transmission and reception of the user data in the mobile terminal 1b in the total time period of the duration and the guard timer value.

A connection is first established between he mobile terminal 1b and the base station 10 (step S1). Next, the no-communication time count unit 32 acquires from the initial data storage unit 21 and the mobile terminal information storage unit 22 the guard timer value and the duration set for the mobile terminal 1b (step S2). When the communication between the mobile terminal 1b and the base station 10 is resumed, the control unit 30 monitors whether or not the transmission and reception of the user data are continued (steps S3 and S4). When the transmission and reception of the user data are interrupted between the mobile terminal 1b and the base station 10, the no-communication time count unit 32 sets the timer for the duration, and monitors whether or not the transmission and reception of the user data are resumed (steps S5 and S6). When the no-communication time is equal to or shorter than the duration, the duration is not changed, control is passed to step S2, and the process is continued (YES in step S6).

When the no-communication time is longer than the duration, the no-communication time count unit 32 sets the guard timer value in the timer, and monitors whether or not the transmission and reception of the user data are resumed (steps S6 through S8). When the transmission and reception of the user data are resumed before the time set in the timer is up, the determination unit 33 determines that the no-communication time is shorter than the total time period of the duration and the guard timer value. Then, the determination unit 33 instructs the duration adjustment unit 34 to extend the duration, and the duration adjustment unit 34 adjusts the duration according to the instruction of the determination unit 33 (steps S9 and S10).

On the other hand, if the transmission and reception of the user data are not resumed when the timer indicates the timeout, the determination unit 33 determines that the no-communication time is longer than the total time period of the duration and the guard timer. Then, the determination unit 33 determines the reduction of the duration, and notifies the duration adjustment unit 34 of the determination. Furthermore, the no-communication time count unit 32 stops the timer (NO in step S9, S11). Then, the duration adjustment unit 34 adjusts the duration according to the instruction of the determination unit 33 (step S12). The method of adjusting the duration is described with reference to FIG. 7 and FIGS. 8A and 8B. After the adjustment of the duration, the operations in and after step S2 are repeated.

When the operation of the control unit 30 is changed as described above with reference to FIG. 9, the time period in which the no-communication time count unit 32 monitors the resumption of the transmission and reception of the user data is equal to or shorter than the total time period of the duration and the guard timer. Therefore, the load of the base station 10 can be reduced.

Figure 10:
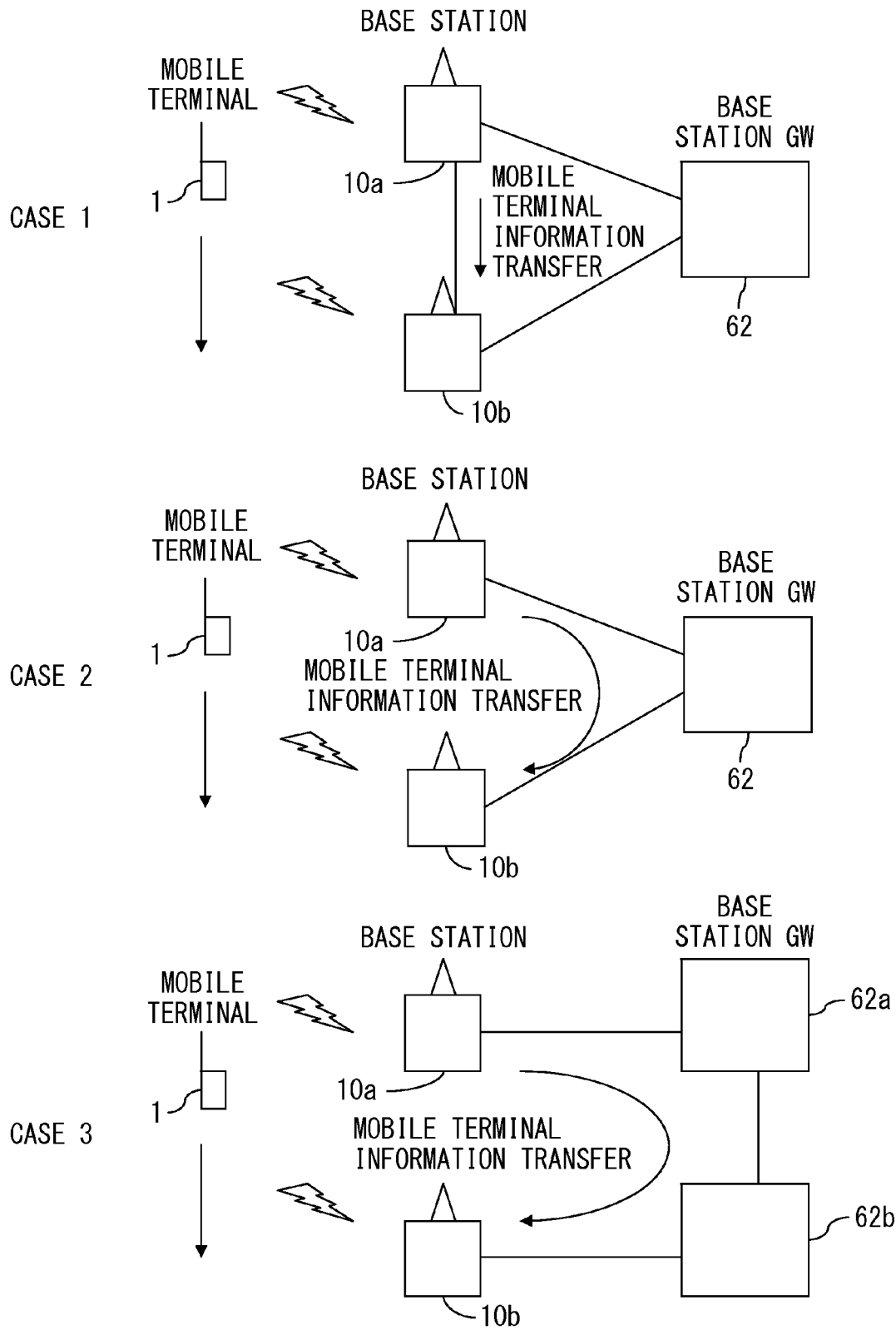
FIG. 10 is an explanatory view of an example of a method of notifying of the duration from a base station which has adjusted the duration to another base station.

Described next is the method of the base station 10b assigning a frequency band using an adjustment result in the base station 10a when the mobile terminal 1 moves from the communication area of the base station 10a to the communication area of the base station 10b. FIG. 10 is an explanatory view of an example of a method of notifying of the duration from the base station 10 which has adjusted the duration to another base station. The mobile terminal 1 performs communications through the base station 10a, and it is assumed that the base station 10a adjusts the duration for the mobile terminal 1. Afterwards, the mobile terminal 1 approaches the communication area of the base station 10b from the communication area of the base station 10a, and performs handover from the base station 10a to the base station 10b. The mobile terminal 1 notifies the base station 10a in advance that the destination is the communication area of the base station 10b when the handover is performed. Then, the base station 10a confirms the base station 10 connected to the base station 10a to notify the base station 10b of the duration adjusted for the mobile terminal 1. In case 1, since the base stations 10a and 10b are directly connected to each other, the base station 10a directly notifies the base station 10b of the duration.

In case 2, the base stations 10a and 10b are not directly connected to each other. Then, the base station 10a notifies the base station gateway 62a of the duration and that the destination of the notification of the duration is the base station 10b. The base station gateway 62a confirms whether or not the base station 10b is a lower base station. In case 2, since the base station 10b is a lower base station of the base station gateway 62, the base station gateway 62 notifies the base station 10b of the duration.

In case 3, since the base stations 10a and 10b are not directly connected to each other, the base station 10a notifies the base station gateway 62a of the duration and that the destination of the notification of the duration is the base station 10b. Since the base station 10b is not a lower base station of the base station gateway 62a, the base station gateway 62a notifies the base station gateway 62b connected to the base station gateway 62a of the duration of the mobile terminal 1 and that the destination of the notification of the duration is the base station 10b. Then, the base station gateway 62b confirms that the base station 10b is a lower base station and notifies the base station 10b of the duration.

In any of cases 1 through 3, the information such as the duration etc. is shared among a plurality of base stations. Therefore, although the mobile terminal 1 moves from the communication area of the first base station 10a to the communication area of the second base station 10b, the second base station 10b can assign the frequency band using the duration adjusted by the source base station 10a.

Second Embodiment

Described in the second embodiment is a base station 50 which changes the method of adjusting the duration depending on the load of the process performed by the base station 50.

Figure 11:
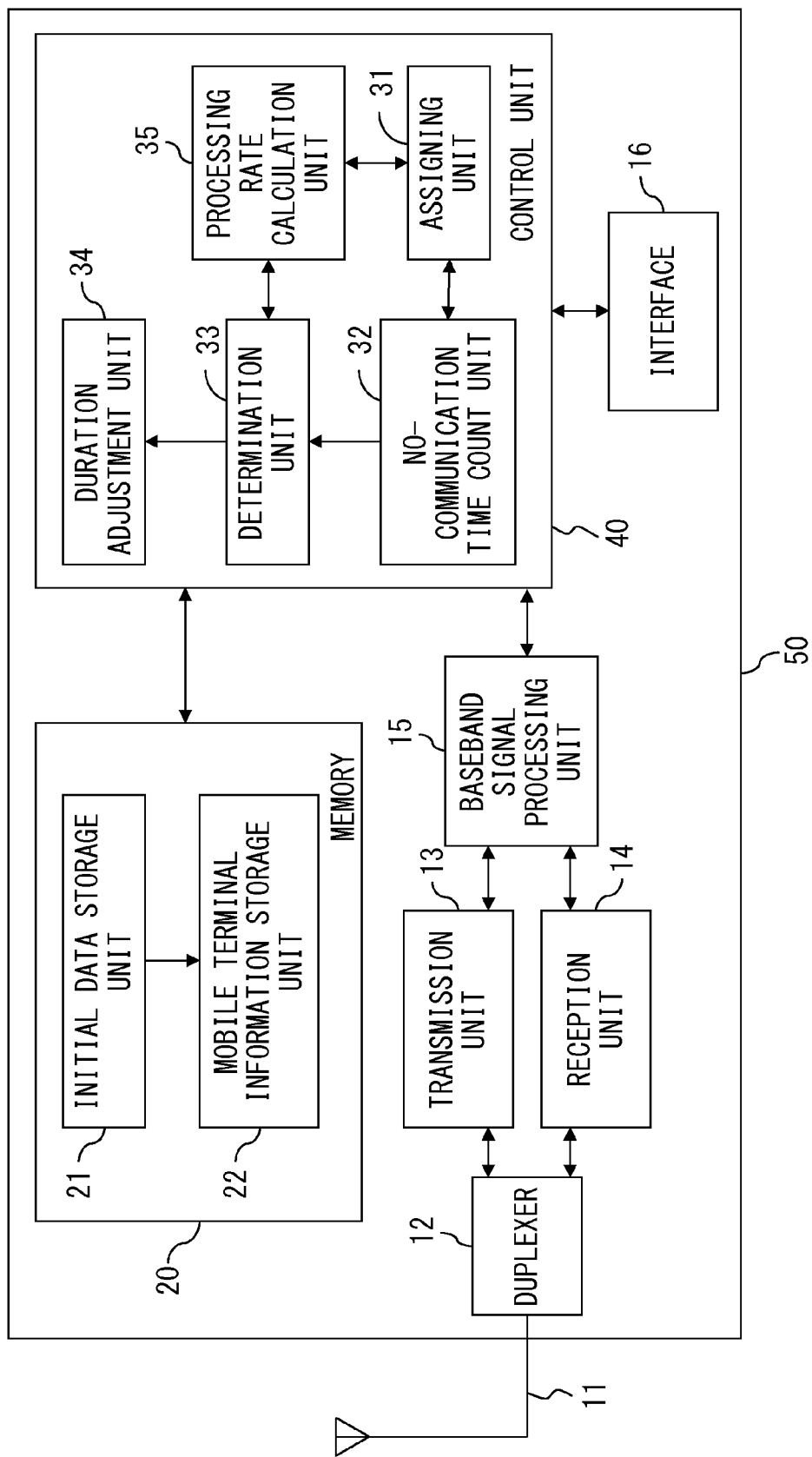
FIG. 11 is an example of a configuration of a base station according to the second embodiment.

FIG. 11 is an example of a configuration of the base station 50 according to the second embodiment. The base station 50 includes the antenna 11, the duplexer 12, the transmission unit 13, the reception unit 14, the baseband signal processing unit 15, the interface 16, the memory 20, and a control unit 40. The control unit 40 includes a processing rate calculation unit 35 in addition to the assigning unit 31, the no-communication time count unit 32, the determination unit 33, and the duration adjustment unit 34. The operations of the assigning unit 31, the no-communication time count unit 32, the duration adjustment unit 34, the memory 20, the antenna 11, the duplexer 12, the transmission unit 13, the reception unit 14, the baseband signal processing unit 15, and the interface 16 of the base station 50 are similar to those according to the first embodiment. The case in which a guard timer value is used as the monitor time is also described in the second embodiment, but the determination unit 33 can also use another value of the monitor time instead of a guard timer value.

The processing rate calculation unit 35 calculates the level of the load of the process of the control unit 40. For example, the processing rate calculation unit 35 calculates the rate (load rate) to the amount of data processed in a predetermined period on the amount of data which can be processed in a predetermined period by the assigning unit 31.

The processing rate calculation unit 35 stores a process threshold. The process threshold can be set by an operator etc. based on the implementation. For example, the process threshold can be 80% of the amount of data which can be processed by the assigning unit 31 in a predetermined period.

The processing rate calculation unit 35 obtains a load rate, and compares the load rate with the process threshold. The processing rate calculation unit 35 notifies the determination unit 33 of the obtained comparison result. The frequency of the processing rate calculation unit 35 calculating the load rate can be adjusted in an arbitrary method. For example, the processing rate calculation unit 35 can calculate the load rate in each predetermined period. The processing rate calculation unit 35 may also be set so that the load rate may be calculated each time the base station 50 transmits a connection response. In this case, the load rate is updated each time a frequency band is assigned.

The determination unit 33 changes, according to the notification from the processing rate calculation unit 35, the adjusting method when the no-communication time is longer than the duration, and shorter than the total time period of the duration and the guard timer. When the load rate is equal to or lower than the process threshold, it is assumed that the amount of processing of the assigning unit 31 is lower than the ability of process of the assigning unit 31. In this case, there is the possibility that the load rate of the base station 50 does not exceed the process threshold although the amount of processing of the assigning unit 31 is increased. Then, the determination unit 33 shortens the duration of the mobile terminal 1 in which the no-communication time is longer than duration and shorter than the total time period of the duration and the guard timer. The method of adjusting the duration when the duration is to be shorter is described in the first embodiment. In this case, the use efficiency of the frequency band can be improved by promoting the release of the frequency band.

On the other hand, when the load rate is higher than the process threshold, it is determined that the amount of processing of the assigning unit 31 is higher than the ability of process of the assigning unit 31. In this case, the determination unit 33 determines to increase the duration of the mobile terminal 1 in which the no-communication time is longer than the duration and the no-communication time is shorter than the total time period of the duration and the guard timer so as to reduce the load of the base station 50 by reducing the amount of processing of the assigning unit 31. The method of adjusting the duration when the duration is to be longer is described above with reference to the first embodiment.

Figure 12:
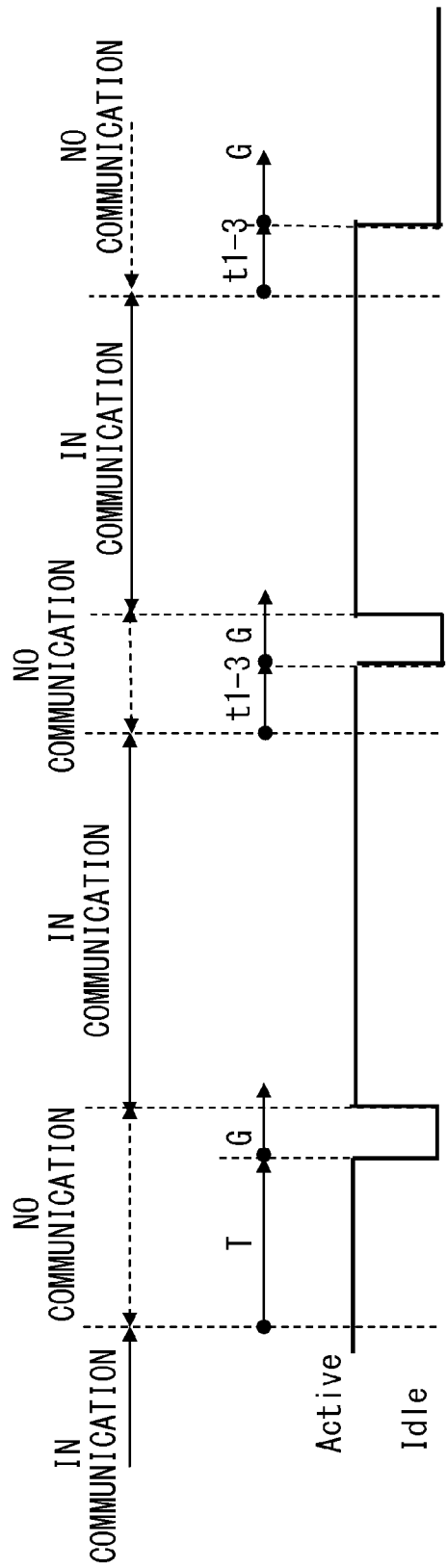
FIG. 12 is an explanatory view of an example of a method of adjusting the duration according to the second embodiment.

FIG. 12 is an explanatory view of an example of a method of adjusting the duration according to the second embodiment. FIG. 12 illustrates the adjusting method when the load rate is equal to or lower than the process threshold. In the example in FIG. 12, the first no-communication time of the mobile terminal 1 is shorter than the total (T+G) of the duration T and the guard timer value G, and longer than the duration. Since the load rate is equal to or lower than the process threshold, the determination unit 33 determines to decrease the duration. The duration adjustment unit 34 adjusts the duration into t1–3 according to the instruction of the determination unit 33. The next no-communication time in the mobile terminal 1 is also shorter than the total of the duration and the guard timer value, and longer than the duration. Then, the determination unit 33 determines to further decrease the duration. The duration adjustment unit 34 compares t1–3 with the guard timer value G. Assume that t1–3 is equal to the guard timer value. Then, the duration adjustment unit 34 does not adjust the duration. The adjusting method when the load rate is higher than the process threshold is described above with reference to FIG. 8A Thus, by adjusting the duration depending on the processing load of the base station 50, the use efficiency of the frequency band can be improved within the scope of suppressing the load on the base station 50. In the description above, the processing rate calculation unit 35 obtains the rate the amount of processing of the assigning unit 31 to the maximum amount of the process of the assigning unit 31. However, the method of calculating the load rate can be arbitrarily changed. For example, the processing rate calculation unit 35 can be the rate of the amount of data processed by the control unit 40 in a predetermined time period to the maximum amount of the data processed by the control unit 40 in the predetermined time period. Depending on the method of calculating the load rate, the process threshold may be changed. For example, when the load rate is obtained based on the amount of data processed by the control unit 40 in a predetermined time period, 70% of the data which can be processed by the control unit 40 in a predetermined time period may be defined as a process threshold.

Third Embodiment

In the first and second embodiments, the base station adjusts the duration, but the network gateway 63 may also adjust the duration. In the third embodiment, even if the mobile terminal 1 performs handover while the mobile terminal 1 is set in the idle mode, the duration can be adjusted so far as the source base station and the destination base station are connected to the same network gateway 63. In addition, in the present embodiment, the calculation of the duration is performed by the network gateway 63. Therefore, this embodiment can be applied in a system including a base station which cannot adjust the duration. When the present embodiment is used in a system including the base station 10 and the base station 50, the base station 10 and the base station 50 are set in advance so that the adjustment value of the duration obtained in the network gateway 63 can be used.

FIG. 13 is an example of a configuration of a network gateway 63 according to the third embodiment. The network gateway 63 includes the memory 20, an interface 41, and a control unit 60. The network gateway 63 communicates with the mobile control device 61, the base station gateway 62, etc. using the interface 41. The memory 20 includes the initial data storage unit 21 and the mobile terminal information storage unit 22. The initial data storage unit 21 and the mobile terminal information storage unit 22 are similar to those in the first embodiment. The control unit 60 includes the no-communication time count unit 32, the determination unit 33, and the duration adjustment unit 34, and optionally includes the processing rate calculation unit 35. The operations of the no-communication time count unit 32, the determination unit 33, the duration adjustment unit 34, and the processing rate calculation unit 35 are similar to those in the first and second embodiments. When the network gateway 63 adjusts the duration, the base station requests the mobile terminal 1 to transfer to the idle mode according to the instruction from the network gateway 63.

The base station included in the network according to the present embodiment notifies, when a connection to the mobile terminal 1 is established, the mobile control device 61 of the identifier for identification of the base station together with the identifier of the mobile terminal 1 which has established the connection. When the connection to the mobile terminal 1 is terminated, the base station can notify the mobile control device 61 of the termination of the connection together with the identifier of the base station and the identifier of the mobile terminal 1. Therefore, the mobile control device 61 holds the identifier of the base station to which the mobile terminal 1 is connected by storing it in a storage unit (not illustrated in the attached drawings). For example, the storage unit of the mobile control device 61 can store a table in which the identifier of the mobile terminal 1 is associated with the identifier of the base station to which the mobile terminal 1 is connected as illustrated in FIGS. 14A and 14B. FIGS. 14A and 14B are examples of the table. The mobile control device 61 can store additional information associated with the identifier of the mobile terminal 1.

FIG. 15 is a flowchart for explanation of an example of the operation performed in the third embodiment. The operations of the network gateway 63 and the base station performed in the third embodiment are described below with reference to FIG. 15 using as an example the case in which the duration is obtained for a mobile terminal 1c. In this example, it is assumed that the network gateway 63 not provided with the processing rate calculation unit 35 is used. Described below are the operations when, for example, the mobile terminal 1c moves from the communication area of the base station 10c to the communication area of the base station 10d. The base station 10c and the base station 10d are connected to the same network gateway 63. Furthermore, the identifier of the mobile terminal 1c is UE3, the identifier of the base station 10c is BS-c, and the identifier of the base station 10d is BS-d.

When the mobile terminal 1c and the base station 10c establish a connection, the base station 10c notifies the mobile control device 61 and the network gateway 63 through the base station gateway 62 of the identifier of the mobile terminal 1c (steps S21 and S22). The base station 10c notifies the mobile control device 61 of the identifier of the base station 10c. In the process in step S22, the mobile control device 61 stores the table illustrated in FIG. 14A in the storage unit.

The no-communication time count unit 32 acquires the initial value of the duration about the notified mobile terminal 1c from the initial data storage unit 21. The control unit 60 stores the identifier of the mobile terminal 1c and the initial value of the duration in the mobile terminal information storage unit 22. The no-communication time count unit 32 acquires a guard timer value from the initial data storage unit 21 (step S23).

Next, the mobile control device 61 notifies the network gateway 63 of the identifier of the base station to which the mobile terminal 1c is connected. Upon receipt of the notification, the network gateway 63 recognizes that the mobile terminal 1c is connected to the base station (base station 10c) provided with the identifier of BS-c. Then, the network gateway 63 and the base station gateway 62 establish tunnel connection used in the communications of the mobile terminal 1c between the network gateway 63 and the base station 10c. The mobile terminal 1c starts the communication with a communication partner device through the base station 10c (step S24). On the other hand, the control unit 60 provided for the network gateway 63 monitors whether or not the transmission and reception of the user data are continued between the mobile terminal 1c and its communication partner device (step S25). For example, the control unit 60 monitors whether or not the user data associated with the identifier of the mobile terminal 1c is included in the data transmitted and received through the network gateway 63.

Upon detection of the interruption of the transmission and reception of the user data between the mobile terminal 1c and its communication partner device, the control unit 60 notifies the no-communication time count unit 32 that the transmission and reception of the user data are interrupted. The no-communication time count unit 32 sets the timer (not illustrated in the attached drawings) for the duration of the mobile terminal 1c and operates the timer (step S26). The control unit 60 continues monitoring the presence/absence of the transmission and reception of the user data in the mobile terminal 1c. When the transmission and reception of the user data are resumed before the duration passes, the control unit 60 notifies the no-communication time count unit 32 of the resumption, and stops the count by the no-communication time count unit 32 (YES in step S27). Then, the operations in and after step S23 are repeated.

On the other hand, when the time of the timer set for the duration is up, the no-communication time count unit 32 notifies the control unit 60 that the no-communication time is equal to or longer than the duration (step S28). The control unit 60 notifies the base station 10c of the identifier of the mobile terminal 1c, and instructs the base station 10c to release the frequency band assigned to the mobile terminal 1c (step S29). The base station 10c instructs the mobile terminal 1c to enter the idle mode. When the mobile terminal 1c enters the idle mode, the frequency band assigned to the mobile terminal 1c is released.

Assume that the mobile terminal 1c enters the communication area of the base station 10d after the mobile terminal 1c enters the idle mode in step S29. The mobile terminal 1c and the base station 10*d* establish a connection, and the base station 10*d* notifies the mobile control device 61 of the identifier of the base station 10*d* and the identifier of the mobile terminal 1*c*. The mobile control device 61 updates the data stored in the storage unit according to the notification from the base station 10*d*. For example, the mobile control device 61 updates the table as illustrated in FIG. 14B.

The no-communication time count unit 32 sets the timer at the guard timer value and operates it (step S30). The control unit 60 monitors whether or not the transmission and reception of the user data are resumed (step S31).

If the transmission and reception of the user data are resumed after the handover of the mobile terminal 1*c* and before the timer is up, the duration adjustment unit 34 extends the duration according to the instruction of the determination unit 33 (step S32). The duration adjustment unit 34 stores the adjusted duration in the mobile terminal information storage unit 22. Then, back in step S23, the no-communication time count unit 32 acquires the adjusted duration from the mobile terminal information storage unit 22. Instep S24, the mobile control device 61 notifies the network gateway 63 according to the table in FIG. 14B that the mobile terminal 1*c* is connected to the base station 10*d*. Then, the network gateway 63 etc. establishes a tunnel connection from the network gateway 63 to the base station 10*d*. The operations in and after step S25 are performed as described above.

On the other hand, if the transmission and reception of the user data are not resumed when a timeout occurs in the guard timer, the determination unit 33 determine to decrease the duration, and notifies the duration adjustment unit 34 of the determination (steps S31, S33). Then, the duration adjustment unit 34 adjusts the duration according to the instruction of the determination unit 33 (step S34). The duration adjustment unit 34 can adjust the duration so that the duration may not be shorter than the guard timer value. The duration adjustment unit 34 stores the adjusted value in the mobile terminal information storage unit 22. The operations after control is returned to step S23 are similar to those when control is returned to step S23 after the operation in step S32.

As described above, according to the present embodiment, the network gateway 63 adjusts the duration. Furthermore, when the mobile terminal 1 resumes the communication with a communication partner device, the network gateway 63 is notified of the base station to which the mobile terminal 1 is connected. Therefore, although the no-communication time exceeds the duration after the handover, the network gateway 63 can instructs the base station to which the mobile terminal 1 is connected to release the frequency band assigned to the mobile terminal 1. Thus, according to the present embodiment, although the handover is performed when the mobile terminal 1 is in the idle mode, the duration can be adjusted if the source base station and the destination base station are lower stations of the same network gateway 63. In the communication through the destination base station, the frequency band can be released by the adjusted duration.

In the example above, the handover is performed when the mobile terminal 1*c* is in the idle mode. However, when the handover is not performed while the mobile terminal 1 is set in the idle mode, the network gateway 63 can similarly adjust the duration.

The example above is an example of an operation. For example, when the control unit 60 is provided with the processing rate calculation unit 35 as illustrated in FIG. 13, the method of adjusting the duration by the duration adjustment unit 34 can be changed depending on the rate of the process as described with reference to the second embodiment.

According to the present embodiment, the network gateway 63 adjusts the duration. Therefore, the base station does not calculate the duration. Furthermore, according to the third embodiment, abase station which has adjusted the duration does not notify the base station to which the mobile terminal 1 is connected of the adjusted duration. Therefore, the processing load of the base station can be reduced as compared with the first and second embodiments.

Fourth Embodiment

Also in the system according to the fourth embodiment, the duration can be set in the case where the handover is performed while the mobile terminal 1 is set in the idle mode. It is assumed that the mobile control device 61 according to the present embodiment is provided with an information storage unit in memory (not illustrated in the attached drawings) as described later.

FIG. 16 is an example of a table stored in an information storage unit. The mobile control device 61 acquires from the base station 10 the identifier of the base station, the identifier of the mobile terminal with which the base station has established a connection, the duration set in the mobile terminal, etc. The mobile control device 61 stores the acquired information in the information storage unit. FIG. 16 is an example of the format of storing data in the information storage unit. Depending on the implementation etc. the type of the information stored in the information storage unit and the format of storing the information can be changed.

FIG. 17 is a flowchart for explanation of an example of an operation performed in the fourth embodiment. The adjustment of the duration performed when a mobile terminal 1*d* performs handover from a base station 10*e* to a base station 10*f* while a mobile terminal 1*d* is set in the idle mode is described with reference to FIG. 17. Here, the identifier of the mobile terminal 1*d* is UE4, the identifier of the base station 10*e* is BS-e, and the identifier of the base station 10*f* is BS-f.

The operations in steps S41 through S53 and S56 through S58 in FIG. 17 are performed by the base station 10*e*. The base station 10*e* makes a determination of NO in step S50. The operations in steps S54 and S55 and the determination of YES in step S50 is made by the base station 10*f*, and the operation in step S59 is performed by the mobile control device 61.

The operations in steps S41 through S47 in FIG. 17 are similar to those in steps S1 through S7 described with reference to FIG. 9. In step S48, the base station 10*e* notifies the mobile control device 61 of the identifier of the base station 10*e* and the identifier of the mobile terminal 1*d*. That is, the base station 10*e* notifies the mobile control device 61 of the identifier when the mobile terminal 1*d* is set in the idle mode and the frequency band assigned to the mobile terminal 1*d* is released. The mobile control device 61 stores the identifier UE4 of the mobile terminal 1*d* and the identifier BE-e of the base station 10*e* in the information storage unit.

In steps S49 through S51, the base station 10*e* sets a timer at the guard timer, and monitors whether or not the communication is resumed. During the process, it is assumed that the mobile terminal 1*d* performs handover to the base station 10*f*.

The operations in steps S51 and S52 illustrated in FIG. 17 are similar to those in steps S11 and S12 in FIG. 9. The base station 10*e* notifies the mobile control device 61 of the adjusted duration, the identifier of the mobile terminal 1*d*, and the identifier of the base station 10*e* (step S53). The mobile control device 61 stores the notified information in the information storage unit. Then, if the mobile terminal 1*d* starts the transmission of the user data or the user data is transmitted to the mobile terminal 1*d*, then the communication starts. At this time point, since the mobile terminal 1*d* establishes a connection with the base station 10*f*, the mobile terminal 1*d* starts communications through the base station 10*f* (step S54). If the communication starts, the control unit 30 of the base station base station 10*f* inquires of the mobile control device 61 about the duration. The mobile control device 61 notifies of the duration at the request of the base station 10*f* (step S59). The base station 10*f* performs the operations in and after step S42 using the notified duration and the guard timer value stored in the initial data storage unit 21.

On the other hand, after the mobile terminal 1*d* performs handover to the base station 10*f* and before the time of the guard timer is up, it is assumed that the communication is resumed (YES in step S50). In this case, the base station 10*f* inquires of the mobile control device 61 about the duration (step S55). The mobile control device 61 searches the information storage unit using the identifier of the mobile terminal 1*d*. The information storage unit stores that the mobile terminal 1*d* entered the idle mode while the mobile terminal 1*d* is connected to the base station 10*e* as illustrated in FIG. 16. Then, the mobile control device 61 inquires of the base station 10*e* about the duration (step S56). Upon receipt of the inquiry from the mobile control device 61, the base station 10*e* calculates the duration (step S57). The calculation is performed by any operation described with reference to the first embodiment. The base station 10*e* notifies the mobile control device 61 of the adjusted duration, the identifier of the mobile terminal 1*d*, and the identifier of the base station 10*e* (step S58). The mobile control device 61 notifies the base station 10*f* of the duration (step S59). In addition, the mobile control device 61 updates the ID of the base station associated with the mobile terminal 1*d* into the ID of the base station 10*f*.

As described above, in the fourth embodiment, the duration can be calculated when the source base station and the destination base station are connected to different network gateways 63. In the description above, the system in which the base station 10 is provided is exemplified, but the base station 50 can be used in the system according to the fourth embodiment.

Fifth Embodiment

In the fifth embodiment, a base station 80 capable of changing the guard timer value depending on the load rate on a control unit 70 is described below.

Figure 18:
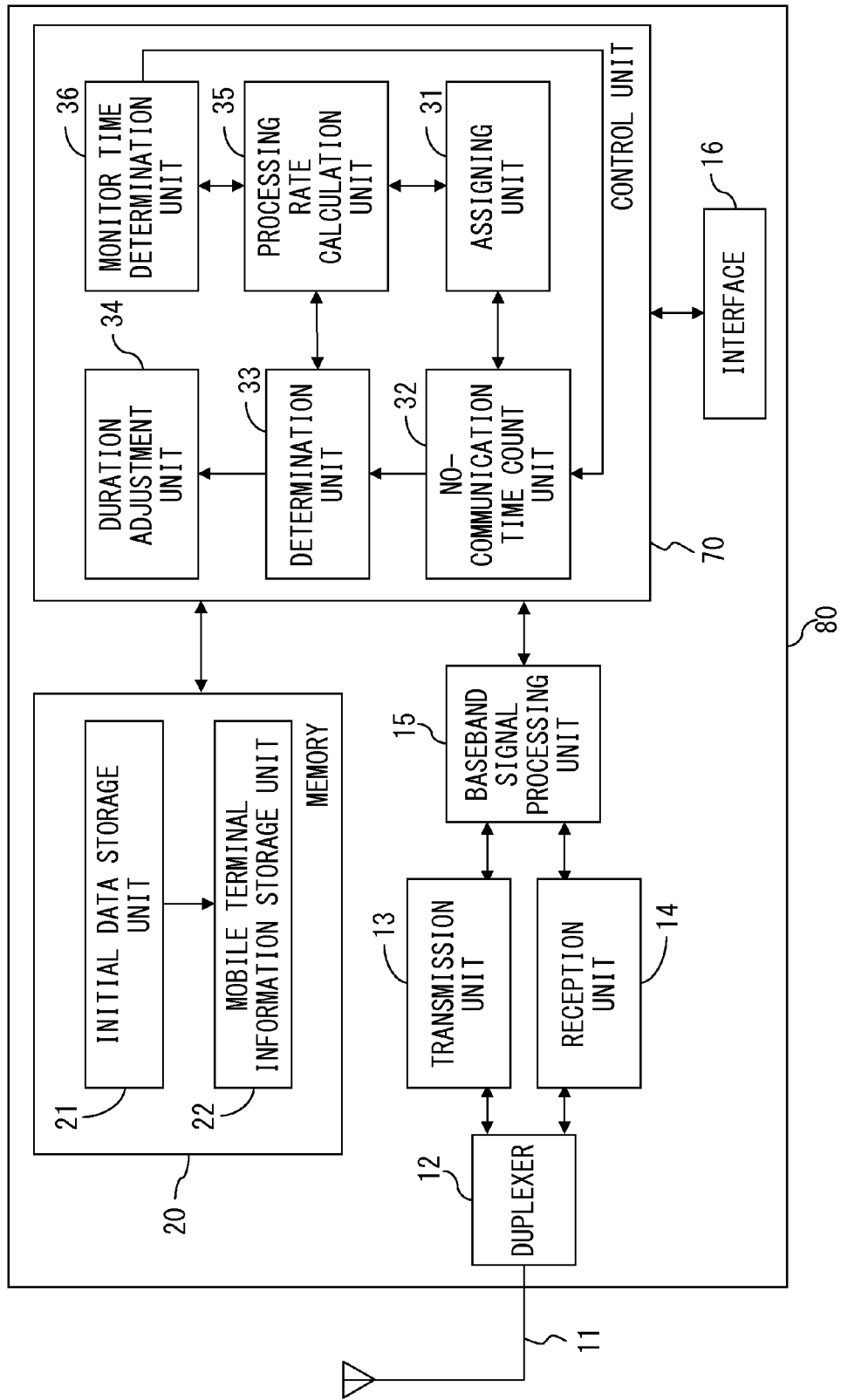
FIG. 18 is an example of a configuration of a base station according to the fifth embodiment.

FIG. 18 is an example of a configuration of the base station 80 according to the fifth embodiment. The base station 80 includes the control unit 70. The control unit 70 includes the assigning unit 31, the no-communication time count unit 32, the determination unit 33, the duration adjustment unit 34, the processing rate calculation unit 35, and the monitor time determination unit 36. The operations of the assigning unit 31, the duration adjustment unit 34, the memory 20, the antenna 11, the duplexer 12, the transmission unit 13, the reception unit 14, the baseband signal processing unit 15, and the interface 16 of the base station 80 are similar to those in the first, second, or fourth embodiment. The method of calculating the load rate in the processing rate calculation unit 35 is also similar to that in the second embodiment.

The monitor time determination unit 36 acquires the load rate from the processing rate calculation unit 35, and obtains a guard timer value based on the load rate. The monitor time determination unit 36 stores in advance the relationship between the load rate and the optimum value of the guard timer, or reads it from the memory 20. The monitor time determination unit 36 notifies the no-communication time count unit 32 of the obtained guard timer value. The no-communication time count unit 32 uses the value notified from the monitor time determination unit 36 as a guard timer value.

FIG. 19 is an example of the relationship between the load rate on a control unit 70 and the optimum value of a guard timer. The graph illustrated in FIG. 19 is used when the processing rate calculation unit 35 calculates as a load rate the use rate of the central processing unit (CPU) for realizing the control unit 70. The monitor time determination unit 36 which uses the relationship in FIG. 19 determines, for example, G4 as the guard timer value if the CPU use rate is 80%, and G2 as the guard timer value if the CPU use rate is 40%.

When the number of mobile terminals 1 connected to the base station 80 increases, the CPU processing rate also rises. When the CPU use rate is high, a longer duration may be preferable to reduce the load on the CPU for realizing the control unit 70. When the guard timer value is increased at a rising CPU use rate, a total of the duration and the guard timer value becomes longer, and there is a higher possibility that the transmission and reception of user data are resumed before the total time period of the duration and the guard timer value passes. Therefore, the operator etc. can store in the monitor time determination unit 36 etc. the CPU use rate associated with the guard timer value so that a larger guard timer value can be obtained at a rising CPU use rate. In the example in FIG. 19, the guard timer value increases with the CPU use rate, but the relationship between the load rate and the guard timer value can be varied depending on the implementation etc. of the base station 80. For example, the monitor time determination unit 36 can store the relationship between the guard timer value and the load rate such as the load rate of the CPU use rate so that a larger amount of increase of the guard timer value can be obtained at a higher CPU use rate. In addition, the operator etc. can store in advance monitor time determination unit 36 the relationship between the guard timer value obtained by a simulation, an experiment, etc. and the CPU use rate. The relationship between the load rate and the guard timer value can also be stored in the memory 20.

The correspondence between the load rate and the guard timer value may be stored in the initial data storage unit 21. FIG. 20 is an example of a table stored in the initial data storage unit 21 which stores the relationship between the load rate and the guard timer value. In this example, the initial data storage unit 21 stores n types (G1 through Gn) of guard timer values. Also, n−1 load thresholds are stored in the initial data storage unit 21 where n is any positive integer equal to or larger than 3. The load threshold is used when the duration adjustment unit 34 determines a guard timer value. The monitor time determination unit 36 compares the load rate calculated by the processing rate calculation unit 35 with load threshold 1, and can set the guard timer value as follows, for example.

When load rate<load threshold 1: G1
When load threshold 1≦load rate<load threshold 2: G2
When load threshold n−1≦load rate: Gn That is, when the load rate is smaller than the load threshold i, and larger than the load threshold i−1, Gi (i=1 through n) is used as the guard timer value. It is assumed that the guard timer value grows in the order of G1<G2< . . . <Gn as illustrated in FIG. 19.

Figure 21:
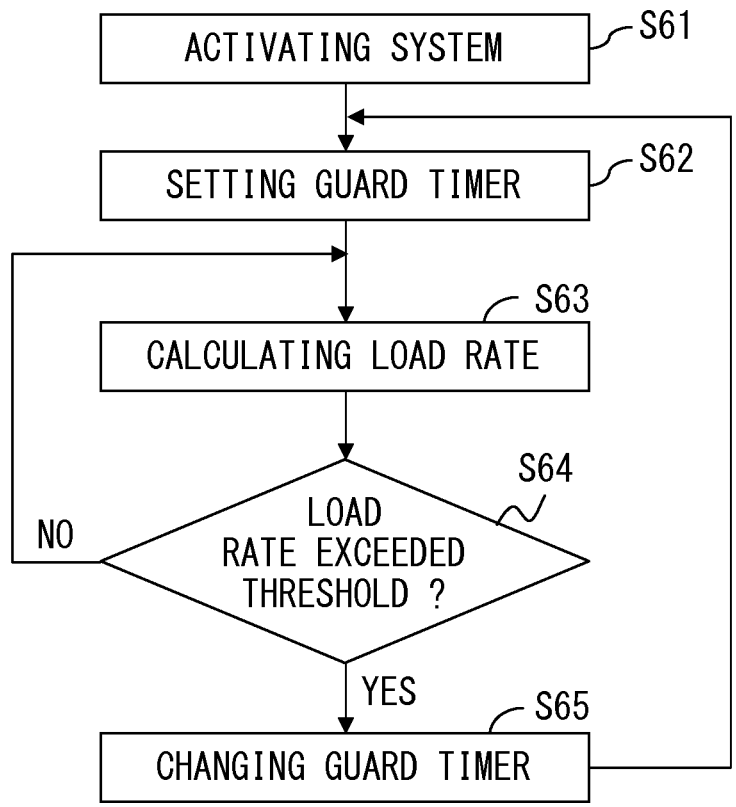
FIG. 21 is a flowchart of an example of an operation of a base station when a guard timer value is changed.

FIG. 21 is a flowchart of an example of an operation of the base station 80 when a guard timer value is changed. First, the base station 80 is activated (step S61). Since the mobile terminal 1 is not connected to the base station 80 when the base station 80 is activated, the monitor time determination unit 36 assumes that the load rate is low. Then, the monitor time determination unit 36 determines as a guard timer value the smallest value (G1) in the guard timer values stored in the initial data storage unit 21. When the monitor time determination unit 36 notifies the no-communication time count unit 32 of the determined guard timer value, the no-communication time count unit 32 sets the notified guard timer value (step S62).

When the activation and initialization of the base station 80 are completed, the processing rate calculation unit 35 calculates a load rate, and outputs the obtained result to the monitor time determination unit 36 (step S63). The monitor time determination unit 36 compares the input load rate with the load threshold, and determines whether or not the set guard timer value is appropriate (step S64). For example, when the guard timer value is G1, the monitor time determination unit 36 compares the load rate with the load threshold 1. If the guard timer value is G2, the monitor time determination unit 36 confirms whether or not the load rate is equal to or higher than the load threshold 2 and whether or not the load rate is a value less than the load threshold 2.

When the set value of the guard timer value is appropriate, the monitor time determination unit 36 does not change the guard timer value (NO in step S64). For example, when the load rate is smaller than the load threshold 1, the monitor time determination unit 36 does not change the guard timer value, and waits for the next notification of the load rate. On the other hand, when the set value of the guard timer is not appropriate, the monitor time determination unit 36 determines guard timer value based on the result of the comparison between the load threshold and the load rate, and notifies the no-communication time count unit 32 of the determined value (step S65). For example, when the load rate is equal to or larger than the load threshold 1, the monitor time determination unit 36 changes the guard timer value based on the result of the comparison between the load rate and another load threshold such as the load threshold 2. Afterwards, if the guard timer value is changed while the base station 80 is operated, the processes in steps S62 through S65 are repeated.

Although the case in which the monitor time determination unit 36 defines G1 as the initial value of the guard timer, the method of selecting the initial value of the guard timer value can be optionally changed. For example, the monitor time determination unit 36 may define as the initial value the largest guard timer value in the initial data storage unit 21 to avoid excess process load of the base station 80, and can also define as the initial value the median value of the guard timer value FIGS. 22A and 22B are explanatory views of examples of operations of the base station 80 when different guard timer values are used. In FIG. 22A, since the load rate is low because the number of the mobile terminals 1 connected to the base station 80 is small, G1 is set as the guard timer value. On the other hand, in FIG. 22B, since the load rate is higher than in the case in FIG. 22A, G2 is set as the guard timer value. With any value as the guard timer value, the duration is adjusted as described above with reference to the first, second, and fourth embodiments.

The case in which the base station 80 can change the guard timer value is described above with reference to FIGS. 18 through 22B, but the network gateway 63 can also change the guard timer value. When the network gateway 63 changes the guard timer value, the network gateway 63 is provided with the monitor time determination unit 36 in addition to the configuration in FIG. 13.

Others

The embodiments are not limited to those described above, but can be realized in a number of other variations. Described below are some examples.

If the transmission and reception of the user data is resumed before the time of the guard timer is up after the duration, the duration adjustment unit 34 can also reduce the duration within the scope in which the amount or reduction of the duration can be smaller than when the communication is resumed after the time of the guard timer is up. For example, when the no-communication time is longer than the total of the duration and the guard timer value, the duration adjustment unit 34 reduces the duration down to ⅓. In this case, the duration adjustment unit 34 can set the duration down to ⅔ when the no-communication time is longer than the duration and shorter than the total of the duration and the guard timer value.

The control unit 30 can use the no-communication time count unit 32 provided with no timer. That is, a time (not illustrated in the attached drawings) provided for the base station 10 can be used for time count, and a timer provided for the no-communication time count unit 32 can also be used for time count.

In the first through fifth embodiments, the case in which a guard timer value is used as a monitor time is exemplified, but in any embodiment, a variation can be realized by the process using a monitor time. In addition, the monitor time can be changed using the method according to the fifth embodiment.

The assigning unit 31, the no-communication time count unit 32, the determination unit 33, the duration adjustment unit 34, the processing rate calculation unit 35, and the monitor time determination unit 36 may be realized by the CPU.

As described above, the time in which the assignment of the frequency band for the mobile terminal in which the transmission and reception of user data have been interrupted is continued can be easily set according to the first through fifth embodiments, thereby improving the use efficiency of the frequency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device, comprising:
   a transmission and reception unit to transmit and receive user data to and from a mobile terminal;
   a no-communication time count unit to count no-communication time in which the transmission and the reception of the user data have been interrupted in the mobile terminal;
   an assignment unit to release a frequency band assigned to the mobile terminal when the no-communication time becomes longer than a duration in which the assignment of the frequency band to the mobile terminal is continued; and
   a duration adjustment unit to adjust the duration when the no-communication time is longer than the duration, and the no-communication time is shorter than a sum of the duration and a monitor time in which it is monitored whether or not the no-communication time is continued after releasing the frequency band.

2. The base station device according to claim 1, wherein the duration adjustment unit adjusts the duration so that an amount of the adjustment of the duration when the no-communication time is longer than the duration and shorter than the sum of the duration and the monitor time is the amount of the adjustment or less of the duration when the no-communication time is longer than the sum of the duration and the monitor time.

3. The base station device according to claim 1, further comprising
a processing rate calculation unit to calculate a rate of an amount of data processed in a predetermined time period by the assignment unit for release of the frequency band assigned to the mobile terminal relative to a maximum amount of data processed in a predetermined time period by the assignment unit, wherein
the duration adjustment unit extends the duration when the rate is higher than a threshold, and reduces the duration when the rate is equal to or lower than the threshold.

4. The base station device according to claim 1, further comprising
a monitor time determination unit to determine the monitor time so that the monitor time become longer when the rate becomes higher, wherein
the duration adjustment unit adjusts the duration using the monitor time determined by the monitor time determination unit.

5. The base station device according to claim 1, wherein:
the transmission and reception unit transmits the duration adjusted by the duration adjustment unit associated with an identifier of the mobile terminal to a control device acquiring control data from a plurality of base station devices; and
the assignment unit acquires from the control device a duration associated with an identifier of a mobile terminal with which connection has been established, and releases a frequency band assigned to the mobile terminal with which connection has been established when the no-communication time for the mobile terminal with which connection has been established becomes longer than a notified duration.

6. The base station device according to claim 1, wherein when the mobile terminal moves to a communication area of another base station, the transmission and reception unit transmits to the another base station an identifier of the mobile terminal and a duration adjusted for the mobile terminal.

7. A communication device, comprising:
a transmission and reception unit to transmit and receive user data to a base station to which a mobile terminal is connected so as to relay a communication between the mobile terminal and a communication partner device;
a no-communication time count unit to count a no-communication time in which the transmission and reception of the user data have been interrupted; and
a duration adjustment unit to acquire a duration in which the base station continues an assignment of a frequency band to the mobile terminal, and to adjust the duration when the no-communication time is longer than the duration, and the no-communication time is shorter than a sum of the duration and a monitor time in which it is monitored whether or not the no-communication time is continued after releasing the frequency band, wherein
the transmission and reception unit transmits the adjusted duration to the base station.

8. A method of assigning a frequency band, comprising:
counting no-communication time in which the transmission and the reception of the user data have been interrupted in a mobile terminal;
releasing a frequency band assigned to the mobile terminal when the no-communication time becomes longer than a predetermined duration; and
adjusting the duration when the no-communication time is longer than the duration, and the no-communication time is shorter than a sum of the duration and a monitor time in which it is monitored whether or not the no-communication time is continued after releasing the frequency band.

9. The method according to claim 8, wherein
the frequency band is assigned to the mobile terminal when the mobile terminal moves from a communication area of a first base station to a communication area of a second base station;
the first base station adjusts the duration;
the first base station notifies a communication device capable of communicating with the first and second base stations of the duration together with an identifier of the mobile terminal;
the second base station acquires from the communication device the duration associated to the identifier of the mobile terminal; and
the second base station releases the frequency band assigned to the mobile terminal when the no-communication time of the mobile terminal is equal to or longer than the duration acquired from the communication device.

* * * * *